United States Patent
Sylla et al.

(10) Patent No.: US 10,200,482 B2
(45) Date of Patent: Feb. 5, 2019

(54) MAPPING NETWORK SERVICE DEPENDENCIES

(71) Applicant: The Boeing Company, Chicago, IL (US)

(72) Inventors: Pape Sylla, Calabasas, CA (US); Hyun Jin Kim, Calabasas, CA (US); Karim El Defrawy, Santa Monica, CA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 14/959,532

(22) Filed: Dec. 4, 2015

(65) Prior Publication Data
US 2016/0119437 A1 Apr. 28, 2016

Related U.S. Application Data

(63) Continuation-in-part of application No. 14/523,473, filed on Oct. 24, 2014, now Pat. No. 9,628,553.

(51) Int. Cl.
*H04L 29/08* (2006.01)
*H04L 12/26* (2006.01)

(52) U.S. Cl.
CPC .................... *H04L 67/16* (2013.01)

(58) Field of Classification Search
CPC ....... H04L 67/10; H04L 41/12; H04L 41/142; H04L 43/0858
USPC ........................................................ 709/224
See application file for complete search history.

(56) References Cited

U.S. PATENT DOCUMENTS

| | | | |
|---|---|---|---|
| 6,182,136 B1 | 1/2001 | Ramanthan et al. | |
| 6,286,047 B1 | 9/2001 | Ramanthan et al. | |
| 6,336,138 B1 | 1/2002 | Caswell et al. | |
| 7,466,655 B1* | 12/2008 | Zhao | H04L 45/08 370/238 |
| 7,697,545 B1 | 4/2010 | O'Sullivan | |
| 8,225,282 B1 | 7/2012 | Massoudi et al. | |
| 2003/0110253 A1 | 6/2003 | Anuszczyk et al. | |
| 2003/0123446 A1* | 7/2003 | Muirhead | H04L 12/4641 370/392 |
| 2008/0162690 A1 | 7/2008 | Karagounis | |
| 2009/0313634 A1* | 12/2009 | Nguyen | G06F 9/5088 718/105 |
| 2010/0231383 A1 | 9/2010 | Levine et al. | |
| 2014/0068132 A1* | 3/2014 | Philip | G06F 15/17312 710/306 |

(Continued)

OTHER PUBLICATIONS

Natarajan et al., "NSDMiner: Automated Discovery of Network Service Dependencies," INFOCOM, copyright 2012, pp. 2507-2515.

(Continued)

*Primary Examiner* — Tu T Nguyen
(74) *Attorney, Agent, or Firm* — Yee & Associates, P.C.

(57) ABSTRACT

A method and apparatus for discovering a service dependency chain. Service dependencies are discovered. A potential service dependency chain is identified based on at least a portion of the service dependencies. A number of data paths are built for the potential service dependency chain. A chain transfer entropy is computed for the potential service dependency chain based on the number of data paths. A determination is made as to whether the potential service dependency chain is the service dependency chain based on the chain transfer entropy.

26 Claims, 14 Drawing Sheets

(56) References Cited

U.S. PATENT DOCUMENTS

2016/0119213 A1    4/2016  Defrawy et al.

OTHER PUBLICATIONS

Chen et al., "Automating Network Application Dependency Discovery: Experiences, Limitations, and New Solutions," 8th USENIX Conference on Operating Systems Design and Implementation, Dec. 2008, pp. 117-130.

Kandula et al., "What's Going on? Learning Communication Rules in Edge Networks," SIGCOMM, Aug. 2008, 12 pages.

Bahl et al., "Towards Highly Reliable Enterprise Network Services Via Inference of Multi-level Dependencies," SIGCOMM, Aug. 2007, 12 pages.

Popa et al., "Macroscope: End-Point Approach to Networked Application Dependency Discovery," CoNEXT, Dec. 2009, pp. 229-240.

Fonesca et al., "X-Trace: A Pervasive Network Tracing Framework," 4th USENIX Symposium on Networked Systems Design & Implementation, Apr. 2007, 14 pages.

Barham et al., "Constellation: automated discovery of service and host dependencies in networked systems," Microsoft Research, Apr. 2008, 14 pages.

Brown et al., "An Active Approach to Characterizing Dynamic Dependencies for Problem Determination in a Distributed Environment," 7th IFIP/IEEE International Symposium on Integrated Network Management, May 2001, 14 pages.

Marshall, "CANDID: Classifying Assets in Networks by Determining Importance and Dependencies," Masters Thesis, University of California at Berkeley, Technical Report No. UCB/EECS-2013-64, May 2013, 93 pages.

El Defrawy et al., "Mapping Network Service Dependencies," U.S. Appl. No. 14/523,473, filed Oct. 24, 2014, 49 pages.

Office Action, dated Aug. 25, 2016, regarding U.S. Appl. No. 14/523,473, 21 pages.

Notice of Allowance, dated Dec. 8, 2016, regarding U.S. Appl. No. 14/523,473, 8 pages.

* cited by examiner

MAPPING NETWORK SERVICE DEPENDENCIES

CROSS-REFERENCE TO RELATED APPLICATION

This application is a continuation-in-part of patent application U.S. Ser. No. 14/523,473, filed Oct. 24, 2014, entitled "Mapping Network Service Dependencies", which is incorporated herein by reference in its entirety.

BACKGROUND INFORMATION

1. Field

The present disclosure relates generally to networks and, in particular, to nodes in a data network. Still more particularly, the present disclosure relates to a method and apparatus for mapping dependencies between services associated with a data network based on the transfer entropy computed for different service pairings.

2. Background

A data network is a communications network that allows devices to exchange data. An Internet Protocol (IP) network is a data network that uses the Internet Protocol suite to send and receive data. The Internet protocol suite is the computer networking model and set of communications protocols used on the Internet and similar computer networks. The different types of communications protocols in the Internet Protocol suite that may be used include the Internet Protocol (IP), the Transfer Control Protocol (TCP), the User Datagram Protocol (UDP), and other types of protocols. An Internet Protocol network may be implemented using any number of Internet networks, local area networks (LAN), enterprise networks, or other types of networks.

Oftentimes, Internet Protocol networks are based on a client-service model. With a client-service model, a client generates and sends a request to a service and the service handles the request and sends a response back to the client. The clients and services that communicate over an Internet Protocol network may be referred to as nodes. Some Internet Protocol networks may include only nodes that use the Transfer Control Protocol.

Data networks and, in particular, Internet Protocol networks are becoming larger and more complex. Consequently, there is a pressing need for tools to aid network administrators and designers in managing these types of networks. For example, a tool capable of determining dependencies between services may be desirable. A dependency between a first service and a second service may occur, for example, when the first service is reliant upon the second service to fulfill a request received by the first service.

Some currently available tools are capable of identifying service dependencies. However, these currently available tools may be unable to identify a chain of dependencies across more than two services. For example, some of these tools may be unable to determine when a first service depends on a second service, which in turn depends on a third service, to fulfill a request received from a client.

Additionally, some of these currently available tools may not use all of the data that is available to these tools, which may reduce the accuracy of the dependencies identified. Therefore, it would be desirable to have a method and apparatus that take into account at least some of the issues discussed above, as well as other possible issues.

SUMMARY

In one illustrative embodiment, a method is provided for discovering a service dependency chain. Service dependencies are discovered. A potential service dependency chain is identified based on at least a portion of the service dependencies. A number of data paths are built for the potential service dependency chain. A chain transfer entropy is computed for the potential service dependency chain based on the number of data paths. A determination is made as to whether the potential service dependency chain is the service dependency chain based on the chain transfer entropy.

In another illustrative example, a method is provided for discovering a service dependency chain. Service dependencies are discovered. A potential service dependency chain is identified based on at least a portion of the service dependencies. A number of data paths are built for the potential service dependency chain. A data path in the number of data paths includes a forward path and a return path that both fall within a path time period. A chain transfer entropy is computed for the potential service dependency chain based on the number of data paths. A determination is made as to whether the potential service dependency chain is the service dependency chain based on the chain transfer entropy.

In yet another illustrative embodiment, an apparatus comprises a network manager. The network manager discovers service dependencies. The network manager identifies a potential service dependency chain based on at least a portion of the service dependencies. The network manager builds a number of data paths for the potential service dependency chain. The network manager computes a chain transfer entropy for the potential service dependency chain based on the number of data paths. The network manager determines whether the potential service dependency chain is the service dependency chain based on the chain transfer entropy.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a network manager capable of identifying the services associated with a data network and discovering dependencies between those services. The illustrative embodiments also recognize and take into account that it may be desirable to have a network manager capable of discovering these dependencies passively. In other words, it may be desirable to have a network manager capable of discovering these dependencies without requiring any active injection of new data into the flow of data across the data network.

The illustrative embodiments recognize and take into account that, in some cases, a first client implemented on a first device may generate a request that is sent from a source port of a first device to a destination port of a second device, where the request is then received and serviced by a first service implemented on the second device. Oftentimes, the destination port is pre-designated, whereas the source port is randomly selected.

In some cases, the first service may have a dependency with a second service implemented on a third device. In other words, the first service may need to request information from the second service in order to fulfill the request by the first client. In these cases, the first service may effectively become a "second client" and may generate a request that is then sent from a source port of the second device to a destination port of the third device, where the request is then received and serviced by the second service. Again, the destination port of the third device may be pre-designated, whereas the source port of the second device may be randomly selected.

Because the source port of the second device from which the request generated by the first service is randomly selected, recognizing that the "second client" is the same first service may be more difficult or time-consuming than desired. Consequently, identifying the dependency between the first service and the second service may be more difficult or time-consuming than desired. Thus, the illustrative embodiments recognize and take into account that it may be desirable to have a method and apparatus that allows services and dependencies between pairs of services to be identified more quickly, easily, or accurately than may be currently possible.

Thus, the illustrative embodiments provide a method and apparatus for discovering dependencies between services associated with a data network. In particular, the illustrative embodiments may provide a method and apparatus for discovering these dependencies passively without causing delays in the flow of data across the data network and without injecting new data into the flow of data across the data network.

Figure 1:
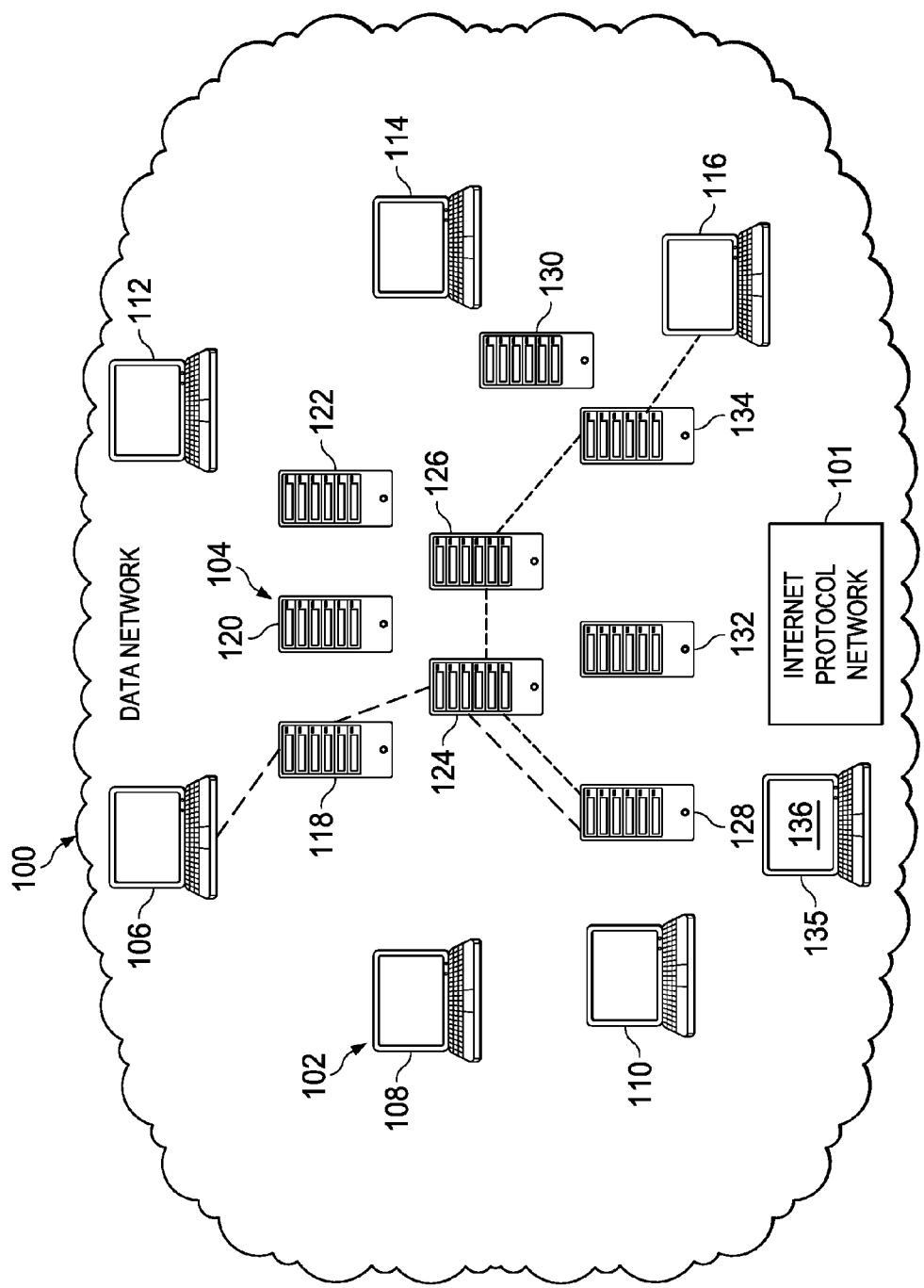
FIG. 1 is an illustration of a data network in accordance with an illustrative embodiment.

Referring now to the figures and, in particular, with reference to FIG. 1, an illustration of a data network is depicted in accordance with an illustrative embodiment. In this illustrative example, data network 100 may take the form of Internet Protocol (IP) network 101 that uses the Transfer Control Protocol/Internet Protocol (TCP/IP) suite. However, in other illustrative examples, data network 100 may take the form of some other type of data network.

Data network 100 may be comprised of any number of Internet networks, local area networks (LAN), enterprise networks, other types of networks, or combination thereof. As one illustrative example, data network 100 may be comprised of a single local area network (LAN). In other illustrative examples, data network 100 may be comprised of an Internet network and two local area networks.

As depicted, plurality of client devices 102 and plurality of service devices 104 may be associated with data network 100. As used herein, being "associated with" a network, such as data network 100, means being part of, connected to, or able to communicate with data network 100 in some other manner. In this illustrative example, a "client device," such as each of plurality of client devices 102, may be any device on which a client is implemented. A "service device," such as each of plurality of service devices 104, may be any device on which a service is implemented.

As depicted, plurality of client devices 102 includes client devices 106, 108, 110, 112, 114, and 116. Plurality of service devices 104 includes service devices 118, 120, 122, 124, 126, 128, 130, 132, and 134. In this illustrative example, a client may be implemented on each of plurality of client devices 102 and a service may be implemented on each of plurality of service devices 104.

Network manager 135 may be used to manage data network 100. In this illustrative example, network manager 135 may be used to detect the services implemented on plurality of service devices 104 and discover dependencies between these services. As depicted, network manager 135 may be implemented on computer system 136. Network manager 135 may be an example of one implementation for network manager 242 described in FIGS. 2-3 below.

Figure 2:
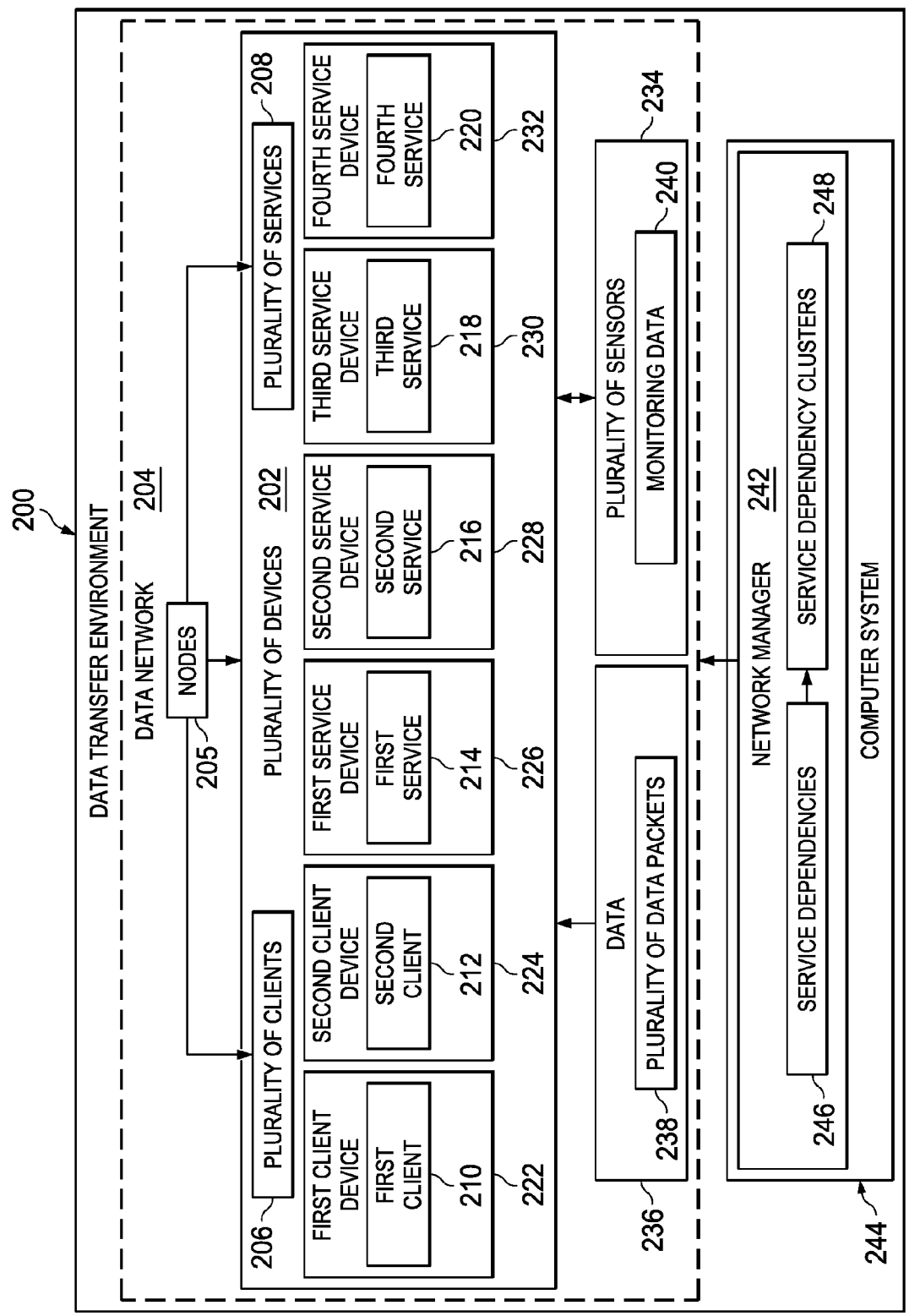
FIG. 2 is a block diagram of a data transfer environment in accordance with an illustrative embodiment.

With reference now to FIG. 2, a block diagram of a data transfer environment is depicted in accordance with an illustrative embodiment. In this illustrative example, data transfer environment 200 may include plurality of devices 202 associated with data network 204. Data network 204 may be comprised of any number of Internet networks, local area networks (LAN), enterprise networks, other types of data networks, or combination thereof. In other illustrative examples, data network 204 may be simply referred to as a network.

Data network 204 may take the form of an Internet Protocol network. The Internet Protocol network may use at least one of the Transfer Control Protocol, the User Datagram Protocol, or some other type of protocol. As used herein, the phrase "at least one of," when used with a list of items, means different combinations of one or more of the listed items may be used and only one of the items in the list may be needed. The item may be a particular object, thing, action, process, or category. In other words, "at least one of"

means any combination of items or number of items may be used from the list, but not all of the items in the list may be required.

For example, "at least one of item A, item B, or item C" or "at least one of item A, item B, and item C" may mean item A; item A and item B; item B; item A, item B, and item C; item B and item C; or item A and item C. In some cases, "at least one of item A, item B, and item C" may mean, for example, without limitation, two of item A, one of item B, and ten of item C; four of item B and seven of item C; or some other suitable combination.

Each of plurality of devices 202 may be considered associated with data network 204 by being part of, connected to, or able to communicate with data network 204 in some other manner. Each of plurality of devices 202 may take the form of a computer, a laptop computer, a tablet, a server computer, a smartphone, a processor unit, a switch, a router, or some other type of device capable of sending and receiving data.

Nodes 205 may be implemented on plurality of devices 202. Nodes 205 may include plurality of clients 206 and plurality of services 208. Depending on the implementation, each of plurality of clients 206 and each of plurality of services 208 may be implemented on a different one of plurality of devices 202. In some illustrative examples, more than one of plurality of clients 206 may be implemented on a particular device or more than one of plurality of services 208 may be implemented on a particular device. In other illustrative examples, one or more clients and one or more services may be implemented on the same device. In this manner, at least one of a client in plurality of clients 206 or a service in plurality of services 208 may be implemented on each of plurality of devices 202.

In one illustrative example, plurality of clients 206 includes first client 210 and second client 212 and plurality of services 208 includes first service 214, second service 216, third service 218, and fourth service 220. First client 210, second client 212, first service 214, second service 216, third service 218, and fourth service 220 may be implemented on first client device 222, second client device 224, first service device 226, second service device 228, third service device 230, and fourth service device 232, respectively, of plurality of devices 202.

As depicted, plurality of sensors 234 may be associated with data network 204. Plurality of sensors 234 may be implemented using hardware, software, firmware, or a combination thereof. Each of plurality of sensors 234 may be used to monitor the flow of data between the various clients and services associated with plurality of devices 202. In one illustrative example, plurality of sensors 234 may be implemented using a plurality of Cisco® Netflow sensors, which may be obtained from Cisco Systems, Incorporated.

Depending on the implementation, each of plurality of sensors 234 may be implemented on a corresponding one of plurality of devices 202. In some cases, more than one of plurality of sensors 234 may be implemented on a same device in plurality of devices 202.

Plurality of sensors 234 monitor the flow of data 236 over data network 204 to generate monitoring data 240. In some cases, this monitoring may be referred to as plurality of sensors 234 "listening" to data network 204 to generate monitoring data 240 about data 236 being exchanged over data network 204.

In one illustrative example, data 236 may be exchanged over data network 204 in the form of plurality of data packets 238. Each of plurality of data packets 238 may include at least one of header data or metadata that may be used by plurality of sensors 234 to track the data packet. As one illustrative example, the header data of a particular data packet in plurality of data packets 238 may include a source Internet Protocol address, a destination Internet Protocol address, a source port, a destination port, and a type of protocol. The type of protocol may be, for example, without limitation, the Transfer Control Protocol, the User Datagram Protocol, or some other type of protocol. In some cases, monitoring data 240 may include at least a portion of this header data or metadata.

Plurality of sensors 234 may send monitoring data 240 to network manager 242. Monitoring data 240 may be sent to network manager 242 as monitoring data 240 is received. Depending on the implementation, monitoring data 240 may be sent to network manager 242 continuously or periodically in response to the occurrence of some event. The event may be, for example, the receiving of a command, the generation of a certain amount of monitoring data, the lapse of a timer, or some other type of event.

In this illustrative example, network manager 242 may be implemented in software, hardware, firmware, or a combination thereof. When software is used, the operations performed by network manager 242 may be implemented using, for example, without limitation, program code configured to run on a processor unit. When firmware is used, the operations performed by network manager 242 may be implemented using, for example, without limitation, program code and data stored in persistent memory to run on a processor unit.

When hardware is employed, the hardware may include one or more circuits that operate to perform the operations performed by network manager 242. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by network manager 242 may be performed using organic components integrated with inorganic components. In some cases, the operations and processes may be performed by entirely organic components, excluding a human being. As one illustrative example, circuits in organic semiconductors may be used to perform these operations and processes.

In this illustrative example, network manager 242 may be implemented using computer system 244. Computer system 244 may be comprised of one or more computers in communication with each other. In other illustrative examples, network manager 242 may be implemented on one of plurality of devices 202.

Network manager 242 may use monitoring data 240 to discover service dependencies 246. Further, network manager 242 may use monitoring data 240 to identify service dependency clusters 248 based on service dependencies 246. The operations performed by network manager 242 are described in greater detail in FIG. 3 below.

Figure 3:
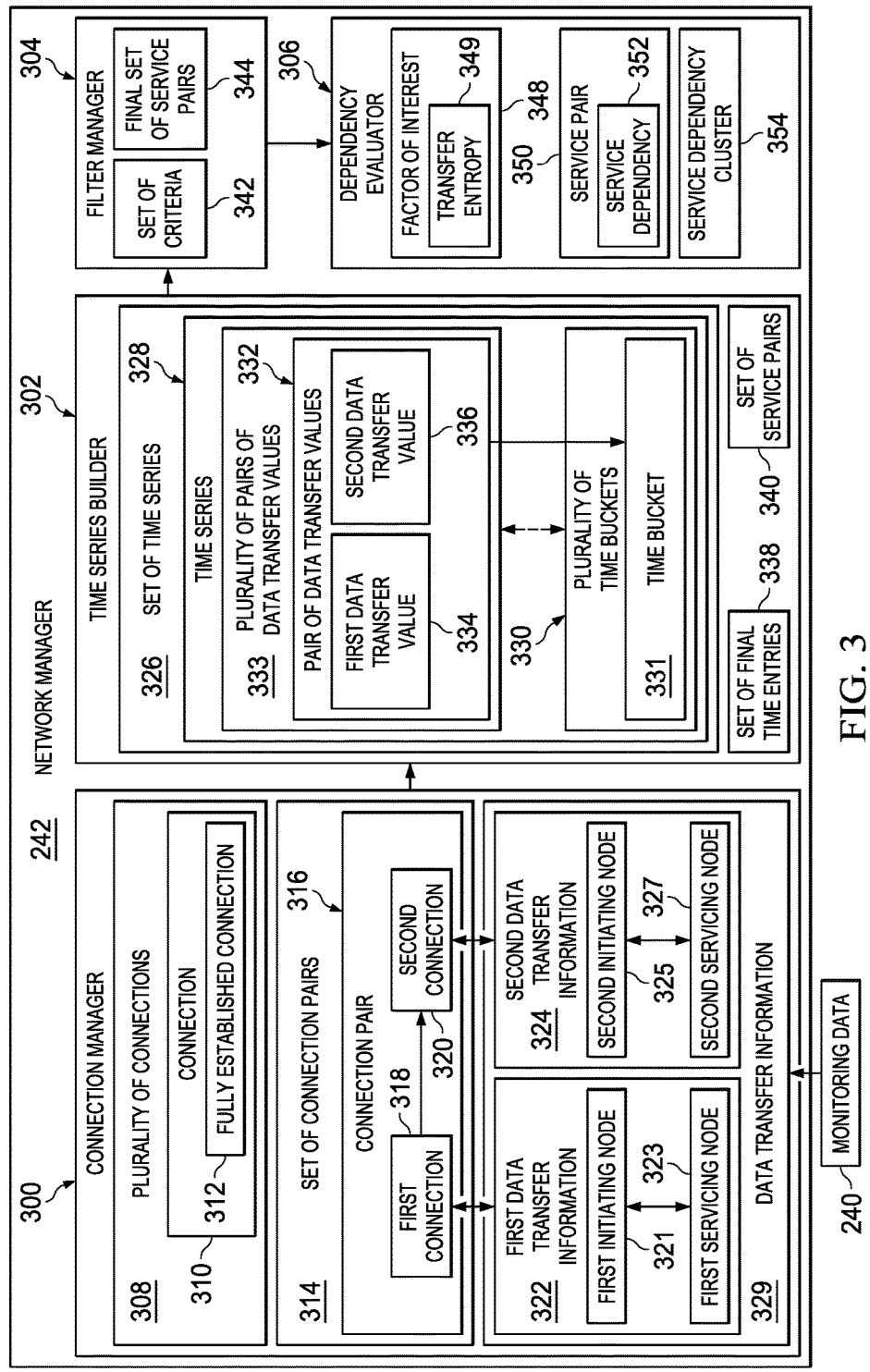
FIG. 3 is a block diagram of a network manager in accordance with an illustrative embodiment.

With reference now to FIG. 3, a block diagram of network manager 242 from FIG. 2 is depicted in accordance with an illustrative embodiment. In this illustrative example, network manager 242 may include connection manager 300, time series builder 302, filter manager 304, and dependency evaluator 306. Each of connection manager 300, time series builder 302, filter manager 304, and dependency evaluator 306 may be implemented using hardware, software, firmware, or a combination thereof.

As depicted, connection manager 300 may receive monitoring data 240. Connection manager 300 may use monitoring data 240 to identify plurality of connections 308. Connection 310 may be an example of one of plurality of connections 308. Connection 310 may be a connection between an initiating node and a servicing node. The initiating node may be either a client or a service that has become, in effect, an "effective client." The servicing node may be the node that services the one or more requests received from the initiating node.

In one illustrative example, plurality of connections 308 may be a plurality of fully established connections. For example, connection 310 may take the form of fully established connection 312. Fully established connection 312 may be one in which both a source and a destination have completed a "handshake" and established a connection using the Transfer Control Protocol. In particular, fully established connection 312 may be one in which the source port on the particular device on which an initiating node is implemented and the destination port on the particular device on which a servicing node is implemented have completed a "handshake" and established a connection using the Transfer Control Protocol.

The source and destination may be identified based on monitoring data 240. For example, monitoring data 240 may include the header data of data packets being sent over data network 204 in FIG. 2. Based on this header data, connection manager 300 may identify those data packets having the same source Internet Protocol address, destination Internet Protocol address, source port, destination port, and protocol as indicating that connection 310 has been established between the source and the destination. The source, which may be the initiating node, may be one of plurality of clients 206 in FIG. 2 or one of plurality of services 208 in FIG. 2. The destination, which may be the servicing node, may be one of plurality of services 208 in FIG. 2. Connection manager 300 may define the destination Internet Protocol address and the destination port as a service in plurality of services 208. In this manner, connection manager 300 may use monitoring data 240 to detect services.

In other illustrative examples, fully established connection 312 may be one in which a bidirectional transfer of data between a source and a destination has been established using the User Datagram Protocol. For example, a transfer of data from an initiating node to a servicing node and a transfer of data back from the servicing node to the initiating node that occur within some selected time period may be considered a bidirectional transfer of data that indicates that fully established connection 312 has been performed.

Connection manager 300 may use plurality of connections 308 to identify set of connection pairs 314. As used herein, a "set of" items may include one or more items. In this manner, set of connection pairs 314 may include one or more connection pairs. Connection pair 316 may be an example of one of set of connection pairs 314. Connection pair 316 may include first connection 318 and second connection 320 from plurality of connections 308.

In one illustrative example, first connection 318 may be between first initiating node 321 and first servicing node 323 and may enable data transfer between first initiating node 321 and first servicing node 323. First initiating node 321 and first servicing node 323 may be considered a client and a service, respectively. In this illustrative example, second connection 320 may be between second initiating node 325 and second servicing node 327 and may enable data transfer between second initiating node 325 and second servicing node 327. Second initiating node 325 and second servicing node 327 may be considered a client and a service, respectively.

Connection manager 300 may evaluate first connection 318 and second connection 320. Connection manager 300 may determine whether a first connection duration of first connection 318 at least partially overlaps with a second connection duration of second connection 320. First connection 318 and second connection 320 may be established as connection pair 316 in response to a determination that the first connection duration of first connection 318 at least partially overlaps with the second connection duration of second connection 320.

In some illustrative examples, first connection 318 and second connection 320 may only be established as connection pair 316 if the time at which second connection 320 starts is after the time at which first connection 318 starts and before the time at which first connection 318 ends. In this manner, connection pair 316 may only be established when second connection 320 is "temporally contained" within first connection 318.

First initiating node 321, first servicing node 323, second initiating node 325, and second servicing node 327 may belong to nodes 205 in FIG. 2. Prior to establishing connection pair 316, it may not be known whether second initiating node 325 is a true client, such as one of plurality of clients 206 in FIG. 2, or an "effective client" that is actually a service, such as one of plurality of services 208 in FIG. 2. Establishing that the second connection duration of second connection 320 at least partially overlaps with the first connection duration of first connection 318 may help identify second initiating node 325 as the same service that is first servicing node 323 but functioning as an "effective client."

In one illustrative example, first initiating node 321 may take the form of first client 210 in FIG. 2 and first servicing node 323 may take the form of first service 214 in FIG. 2. Second initiating node 325 may take the form of first service 214 in FIG. 2 and second servicing node 327 may take the form of second service 216 in FIG. 2. In this manner, first connection 318 may be referred to as a client-service connection and second connection 320 may be referred to as a service-service connection.

Connection manager 300 may generate data transfer information 329 for set of connection pairs 314 using monitoring data 240. Data transfer information 329 may include information about the amount of data transferred over each of the connections that form each connection pair in set of connection pairs 314.

As one illustrative example, connection manager 300 may generate first data transfer information 322 and second data transfer information 324 for first connection 318 and second connection 320, respectively, of connection pair 316. First data transfer information 322 and second data transfer information 324 may be in the form of an amount of data transferred with respect to time.

For example, first data transfer information 322 may take the form of, for example, X(t), where X(t) represents the amount of data transferred over first connection 318 with respect to time t. Further, second data transfer information 324 may take the form of, for example, Y(t), where Y(t)

represents the amount of data transferred over second connection 320 with respect to time t.

Both first data transfer information 322 and second data transfer information 324 may capture forward data traffic and reverse data traffic. For example, each $X(t_n)$ may be a value for the amount of data transferred at time $t_n$ from first initiating node 321 to first servicing node 323 or from first servicing node 323 to first initiating node 321. Similarly, each $Y(t_n)$ may be a value for the amount of data transferred at time $t_n$ from second initiating node 325 to second servicing node 327 or from second servicing node 327 to second initiating node 325.

Any number of data transmissions may occur over first connection 318 and second connection 320. Each of these data transmissions may be comprised of the transmission of one or more data packets. In one illustrative example, both X(t) and Y(t) may be discrete series in which time t represents the start time of each data transmission. The values for the amount of data transferred, $X(t_n)$ or $Y(t_n)$, at any time $t_n$, may be determined using monitoring data 240. Depending on the implementation, these values may be in units of data packets, bytes, kilobytes, or some other measure of data quantity.

Time series builder 302 may use data transfer information 329 to build set of time series 326 for set of connection pairs 314. In particular, set of time series 326 may include a corresponding time series for each of set of connection pairs 314. As one illustrative example, time series 328 of set of time series 326 may correspond to connection pair 316 of set of connection pairs 314.

Time series 328 may be built using first data transfer information 322 and second data transfer information 324. As depicted, time series 328 may include plurality of pairs of data transfer values 333.

At least a portion of plurality of pairs of data transfer values 333 may correspond to plurality of time buckets 330. Each of plurality of time buckets 330 may be created, or defined, based on a particular time interval, Δ. This particular time interval may be selected as, for example, without limitation, the maximum period of time that a given piece of information will take to move from first initiating node 321 to first servicing node 323 over first connection 318 and from second initiating node 325 to second servicing node 327 over second connection 320. This maximum period of time may be estimated based on monitoring data 240.

In one illustrative example, when the time between two consecutive values, such as $X(t_1)$ and $X(t_2)$, is less than the particular time delay, Δ, a time bucket may be defined as the time between $t_1$ and $t_2$. Otherwise, when the time between the two values, $X(t_1)$ and $X(t_2)$, is equal to or greater than the particular time delay, Δ, the time bucket may be defined as the time between $t_1$ and $t_1+\Delta$. In this manner, only one $X(t_n)$ may fall within each of plurality of time buckets 330. In particular, the corresponding time $t_n$ for each $X(t_n)$ may be the start time for each time bucket in plurality of time buckets 330.

Time bucket 331 may be an example of one of plurality of time buckets 330. Time bucket 331 may be defined as beginning at $X(t_n)$. Pair of data transfer values 332 may be an example of one of plurality of pairs of data transfer values 333 identified for time bucket 331. Pair of data transfer values 332 may include first data transfer value 334 and second data transfer value 336. First data transfer value 334 may be the value of $X(t_n)$. Second data transfer value 336 may be the sum of the values of all Y(t) that fall within time bucket 331. When no Y(t) falls within time bucket 331, second data transfer value 336 may be assigned a null value. The null value may be zero.

In some cases, one or more of plurality of pairs of data transfer values 333 may not correspond to a time bucket. For example, in other illustrative examples, pair of data transfer values 332 may not correspond to time bucket 331. When a particular $Y(t_n)$ does not fall within any of plurality of time buckets 330, first data transfer value 334 of pair of data transfer values 332 may be assigned a null value and second data transfer value 336 may be the value of $Y(t_n)$.

Further, for all X(t) during first connection 318 for which there is no corresponding Y(t) because there is no overlapping second connection 320 present at that time, a pair of data transfer values may be identified where the second data transfer value is assigned a null value. For all Y(t) during second connection 320 for which there is no corresponding X(t) because there is no overlapping first connection 318 present at that time, a pair of data transfer values may be identified where the first data transfer value is assigned a null value.

In other illustrative examples, plurality of time buckets 330 may be selected such that each of plurality of time buckets 330 has a same time interval, Δ. For each time bucket, any values of X(t) that fall within the time interval corresponding to that time bucket may be summed to form the first data transfer value for the pair of data transfer values corresponding to that time bucket. Similarly, any values of Y(t) that fall within the time interval corresponding to that time bucket may be summed to form the second data transfer value for the pair of data transfer values corresponding to that time bucket. When no X(t) or Y(t) fall within the time interval corresponding to a particular time bucket, the corresponding data transfer value may be assigned a null value.

All of plurality of pairs of data transfer values 333 together form time series 328. Each of set of time series 326 may include a similar plurality of pairs of data transfer values for the connection pair of set of connection pairs 314 corresponding to that time series.

Once set of time series 326 have been built, time series builder 302 may identify set of final time series 338 for set of service pairs 340. The time series for each of set of connection pairs 314 having a same type of second connection may be combined to form a final time series for the corresponding service pair.

In particular, for any connection pairs in set of connection pairs 314 having a same type of second connection between a same second initiating node and a same second servicing node, the time series for these connections pairs may be combined, or interleaved, to form a final time series. In one illustrative example, these time series may only be combined when the second connection durations for these second connections at least partially overlap. With the assumption that both the second initiating node and the second servicing node are two services that form a service pair, the final time series formed may be considered corresponding to this service pair. In this manner, set of final time series 338 may be identified for set of service pairs 340.

In some illustrative examples, set of final time series 338 and set of service pairs 340 may then be evaluated by filter manager 304 based on set of criteria 342 to form final set of service pairs 344. Set of criteria 342 may include any number of criteria for selectively filtering set of service pairs 340 to form final set of service pairs 344.

For example, filter manager 304 may filter such that only those service pairs having a final time series with at least a certain number of pairs of data transfer values, or points, may be selected. As one illustrative example, only service pairs having a final time series of at least 5, 10, 15, 20, 50, 100, or some other number of pairs of data transfer values may be selected. In some cases, the threshold number of pairs of data transfer values required may be set to be the product of the largest number of X(t) squared for any given connection and the largest number of Y(t) for any given connection. The number of X(t) and the number of Y(t) may be the number of transmissions sent over the corresponding connection.

As another example, filter manager 304 may filter such that only service pairs that were active during a given time of interest may be selected. For example, only service pairs that have at least some minimum number of X(t), Y(t), or both within a particular period of time may be selected.

In yet another example, filter manager 304 may filter such that only service pairs having services corresponding to particular ports are selected. In some cases, filter manager 304 may exclude service pairs having services for which less than some minimum number of connections were established. For example, a service pair having a service with which fewer than three connections were established may be excluded. In this manner, any number of criteria may be used to form final set of service pairs 344.

Dependency evaluator 306 may then evaluate each of final set of service pairs 344 according to some factor of interest 348. In this illustrative example, factor of interest 348 may be transfer entropy 349. In particular, dependency evaluator 306 may compute transfer entropy 349 for each of final set of service pairs 344.

Service pair 350 may be an example of one of final set of service pairs 344. Service pair 350 may have the following final time series:

$$x = \{x(1), x(2), x(3), x(4), \ldots, x(N)\} \quad (1)$$

$$y = \{y(1), y(2), y(3), y(4), \ldots, y(N)\} \quad (2)$$

Dependency evaluator 306 may compute the joint and conditional probability distribution functions for this final time series as follows:

$$p(y(t+\tau), y^{(k)}(t), x^{(l)}(t)) \quad (3)$$

$$p(t+\tau)|y^{(k)}(t), x^{(l)}(t)) \quad (4)$$

$$p(y(t+\tau)|y^{(k)}(t)) \quad (5)$$

where $x^{(l)}(t) = (x(t-l+1), \ldots, x(t))$ is the vector of the time series part x at time t with length l history and $y^{(k)}(t) = (y(t-k+1), \ldots, y(t))$ is the vector of the time series part y at time t with length l history. The probability distribution function may be estimated as follows:

$$\hat{p}\big(y(t) = y_n, x(t) = x_m\big) = \frac{1}{N} N_{nm} \quad (6)$$

where N is the total number of points $(x_i, y_j)$ in the final time series and $N_{nm}$ is the number of times that $(x_n, y_m)$ occurs in the final time series. An estimate of conditional probability may then be computed as follows:

$$\hat{p}(y(t)|x(t)) = \frac{\hat{p}(y(t), x(t))}{\hat{p}(x(t))}. \quad (7)$$

The transfer entropy may then be computed as follows:

$$TE_{x \to y} = \sum_{y(t+\tau), y^{(k)}(t), x^{(l)}(t)} p(y(t+\tau), y^{(k)}(t), x^{(l)}(t)) \log \frac{p(y(t+\tau)|y^{(k)}(t) x^{(l)}(t))}{p(y(t+\tau)|y^{(k)}(t))} \quad (8)$$

where TE is transfer entropy 349 for service pair 350 and τ is the time lag in the future.

In response to a determination that transfer entropy 349 for service pair 350 is greater than a selected threshold, service pair 350 may be identified as service dependency 352, meaning that the two services that form service pair 350 may be dependent. In this illustrative example, the selected threshold may be configurable and may be selected by the network administrator. Transfer entropy 349 measures the amount of information being exchanged between the two services that make up service pair 350. Thus, when the amount of information being exchanged is sufficiently high, these two services may be considered dependent. In this manner, any number of service dependencies may be identified for final set of service pairs 344.

In some cases, service dependency cluster 354 may be identified. Service dependency cluster 354 may be identified between two or more service pairs. For example, a first service pair may include a first service and a second service that have been determined dependent. A second service pair may include a third service and a fourth service that have been determined dependent. When the second service and the third service are the same service, these two service pairs may be considered as forming service dependency cluster 354. If a third service pair includes a fifth service and sixth service that have been determined dependent and the fifth service is the same as either the second service of the first service pair or the fourth service of the second service pair, then this third service pair may be added to service dependency cluster 354.

An additional criteria in forming service dependency cluster 354 may be that the connection durations between the different service pairs at least partially overlap with each other. As one illustrative example, using the above-described first service pair and second service pair, the connection duration between the third service and the fourth service of the second service pair may be required to begin after the start of, but before the end of, the connection duration between the first service and the second service of the first service pair in order for the first service pair and the second service pair to be identified as establishing service dependency cluster 354.

In one illustrative example, first connection 318 may be between Service_1 and Service_2. These two services may be determined to form a first service pair. Further, second connection 320 may be between Service_2 and Service_3. These two services may be determined to form a second service pair.

Dependency evaluator 306 determines whether each of the first service pair and the second service pair is a service dependency. Further, dependency evaluator 306 may evaluate whether the first service pair and second service pair form service dependency cluster 354.

In evaluating whether the first service pair and the second service pair form service dependency cluster 354, dependency evaluator 306 identifies a first connection duration for first connection 318 between the first service pair and the second connection duration for second connection 320 between the second service pair. Dependency evaluator 306 then determines whether the second connection duration is "temporally contained" within the first connection duration. In other words, dependency evaluator 306 determines whether the time at which second connection 320 between Service_2 and Service_3 and starts is after the time at which first connection 318 between Service_1 and Service_2 starts and before the time at which first connection 318 ends.

To determine whether the first service pair and the second service pair form service dependency cluster 354, dependency evaluator 306 computes total transfer entropy 834 as follows:

$$TE_{1 \to 3} = \sum_{y(t+\tau), y^{(k)}(t), x^{(l)}(t)} p(y(t+\tau), y^{(k)}(t), x^{(l)}(t)) \log \frac{p(y(t+\tau) \mid y^{(k)}(t) x^{(l)}(t))}{p(y(t+\tau) \mid y^{(k)}(t))} \quad (9)$$

where $TE_{1 \to 3}$ is the total transfer entropy between Service_1 and Service_3. If the total transfer entropy is greater than a selected threshold, then dependency evaluator 306 successfully identifies that Service_1, Service_2, and Service_3 form service dependency cluster 354. Service dependency cluster 354 may also be referred to as a service chain.

In this manner, any number of service dependency clusters 248 in FIG. 2 may be formed for data network 204 in FIG. 2 by network manager 242. Each of service dependency clusters 248 may take the form of a chain structure or a tree structure, depending on how the dependencies are associated with each other as described above.

The illustrations of data transfer environment 200 in FIG. 2 and network manager 242 in FIGS. 2-3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 4:
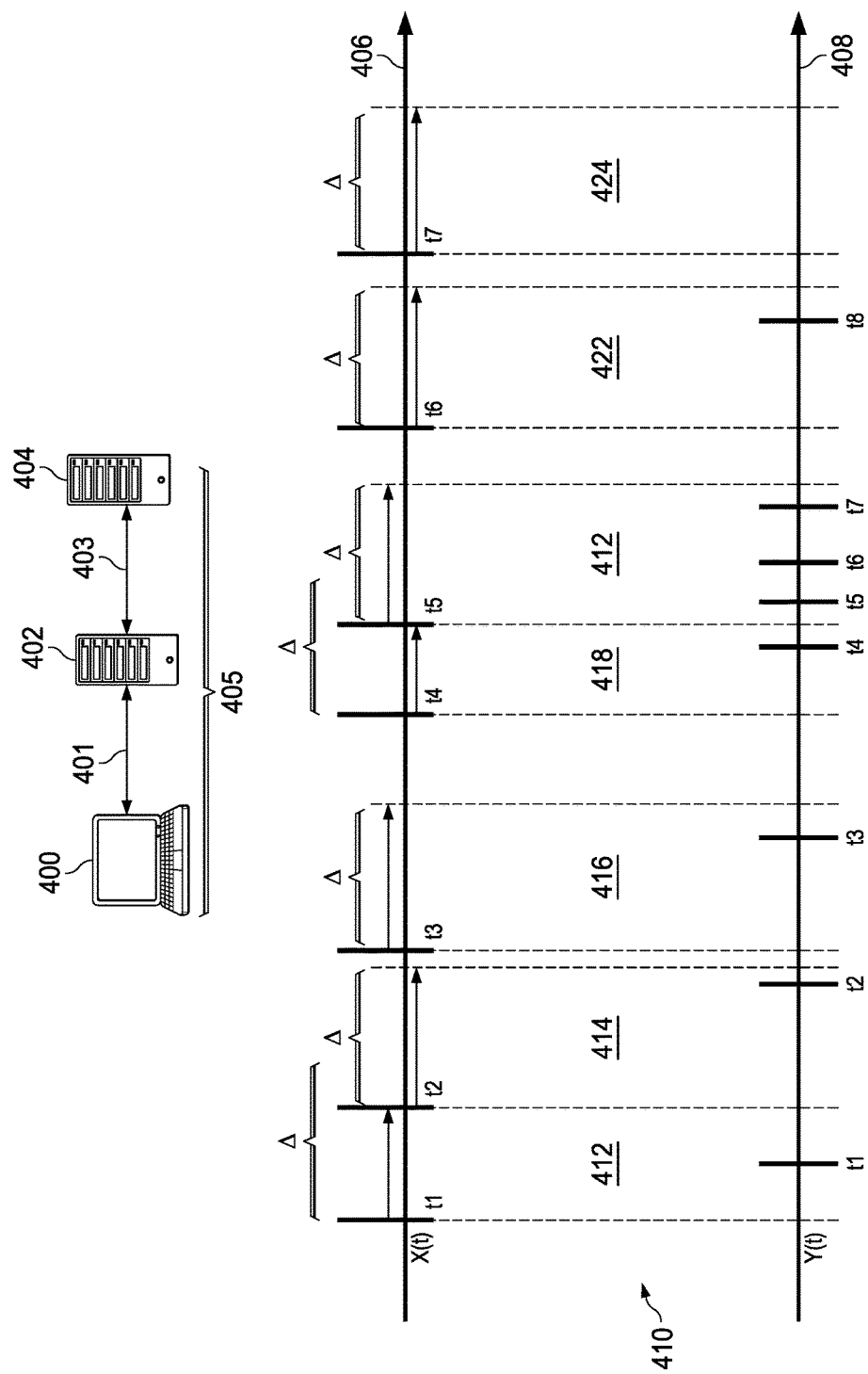
FIG. 4 is an illustration of the building of a time series for a connection pair in accordance with an illustrative embodiment.

With reference now to FIG. 4, an illustration of the building of a time series for a connection pair is depicted in accordance with an illustrative embodiment. In this illustrative example, first connection 401 may be established between client 400 and first service 402. Second connection 403 may be established between first service 402 and second service 404. First connection 401 and second connection 403 may form connection pair 405.

First data transfer information 406, X(t), corresponding to first connection 401 and second data transfer information 408, Y(t), corresponding to second connection 403 are depicted. Plurality of time buckets 410 have been created. Plurality of time buckets 410 may include time buckets 412, 414, 416, 418, 420, 422, and 424.

As depicted, each of plurality of time buckets 410 may begin at the time $t_n$ for each corresponding $X(t_n)$. Each of plurality of time buckets 410 may end at the time $t_{subs}$ for each subsequent $X(t_{subs})$ that follows $X(t_n)$ when $t_{subs} - t_n$ is less than or equal to a selected time delay, $\Delta$, or at time $t_n + \Delta$ when $t_{subs} - t_n$ is greater than the selected time delay, $\Delta$. Depending on the creation of plurality of time buckets 410, zero, one, or more of the values of Y(t) may fall within each of plurality of time buckets 410.

Figure 5:
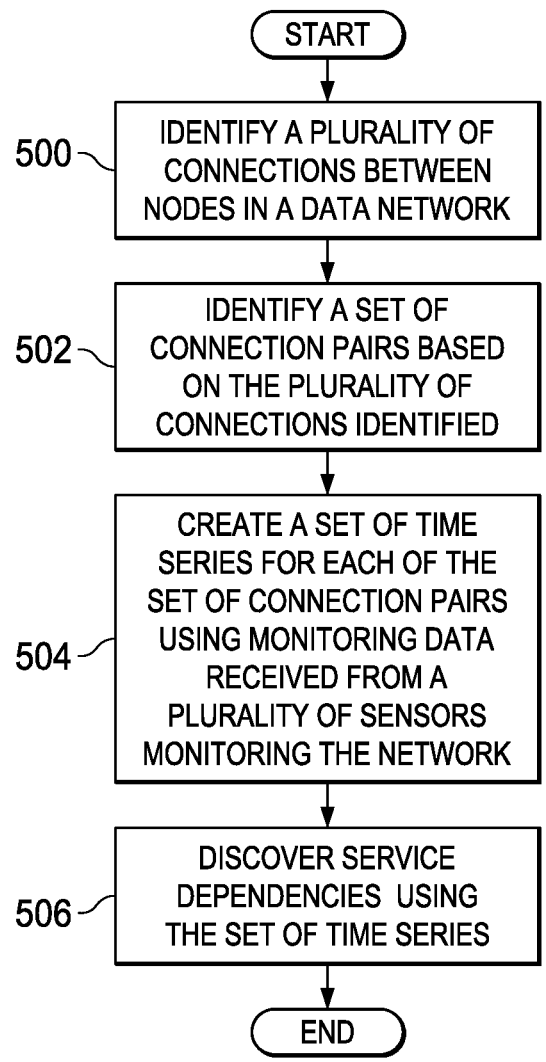
FIG. 5 is a flowchart of a process for discovering service dependencies in a data network in accordance with an illustrative embodiment.

With reference now to FIG. 5, a flowchart of a process for discovering service dependencies in a data network is depicted in accordance with an illustrative embodiment. The process illustrated in FIG. 5 may be implemented using network manager 242 described in FIGS. 2-3.

The process may begin by identifying a plurality of connections between nodes in a data network (operation 500). Next, a set of connection pairs is identified based on the plurality of connections identified (operation 502). Thereafter, a set of time series is created for each of the set of connection pairs using monitoring data received from a plurality of sensors monitoring the data network (operation 504). Service dependencies are then discovered using the set of time series (operation 506), with the process terminating thereafter.

Figure 6:
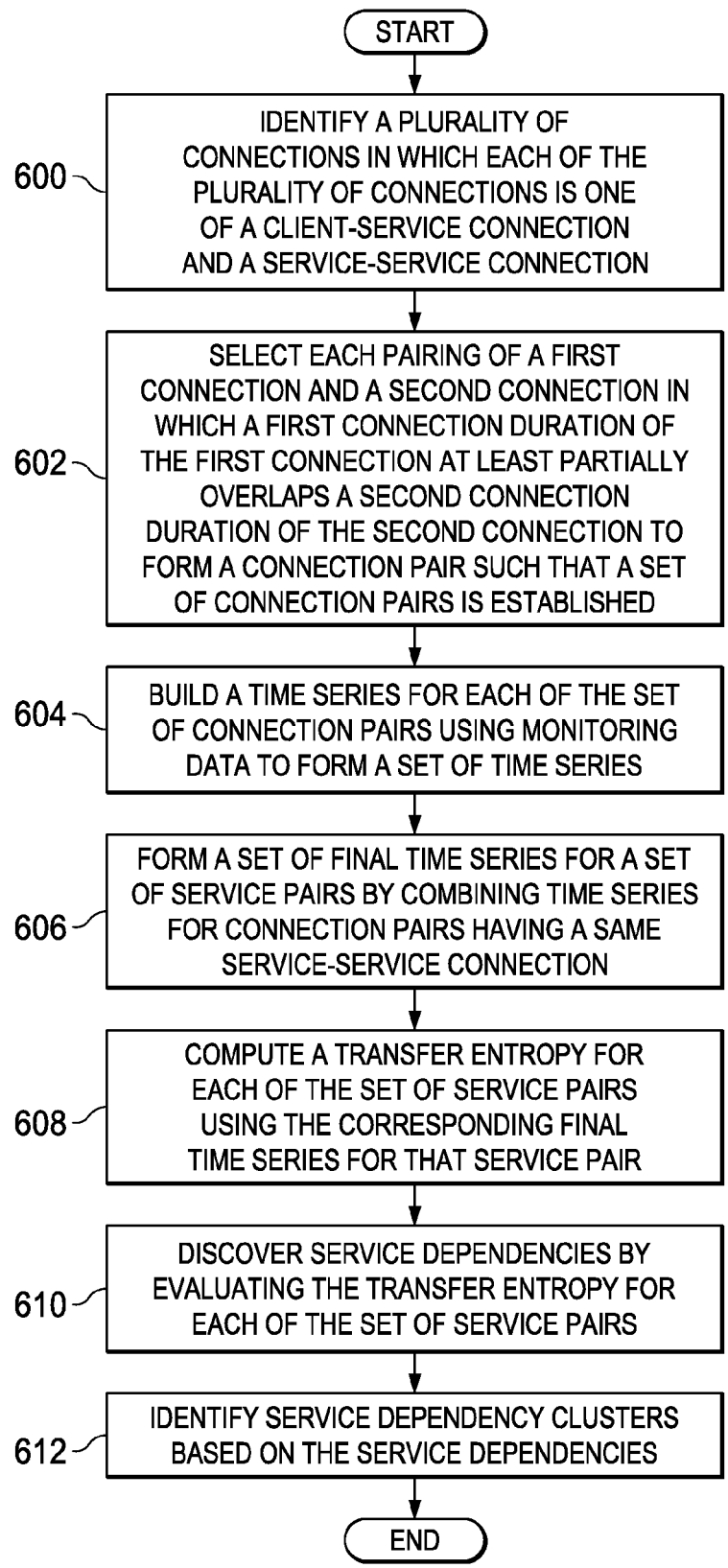
FIG. 6 is a flowchart of a process for identifying service dependency clusters in a data network in accordance with an illustrative embodiment.

With reference now to FIG. 6, a flowchart of a process for identifying service dependency clusters in a data network is depicted in accordance with an illustrative embodiment. The process illustrated in FIG. 6 may be implemented using network manager 242 described in FIGS. 2-3.

The process begins by identifying a plurality of connections in which each of the plurality of connections is one of a client-service connection and a service-service connection (operation 600). Next, each pairing of a first connection and a second connection in which a first connection duration of the first connection at least partially overlaps a second connection duration of the second connection is selected to form a connection pair such that a set of connection pairs is established (operation 602).

Next, a time series is built for each of the set of connection pairs using monitoring data to form a set of time series (operation 604). Thereafter, a set of final time series is formed for a set of service pairs by combining time series for connection pairs having a same service-service connection (operation 606).

Thereafter, a transfer entropy is computed for each of the set of service pairs using the corresponding final time series for that service pair (operation 608). Then, service dependencies are discovered by evaluating the transfer entropy for each of the set of service pairs (operation 610). Service dependency clusters are identified based on the service dependencies (operation 612), with the process terminating thereafter.

Figure 7:
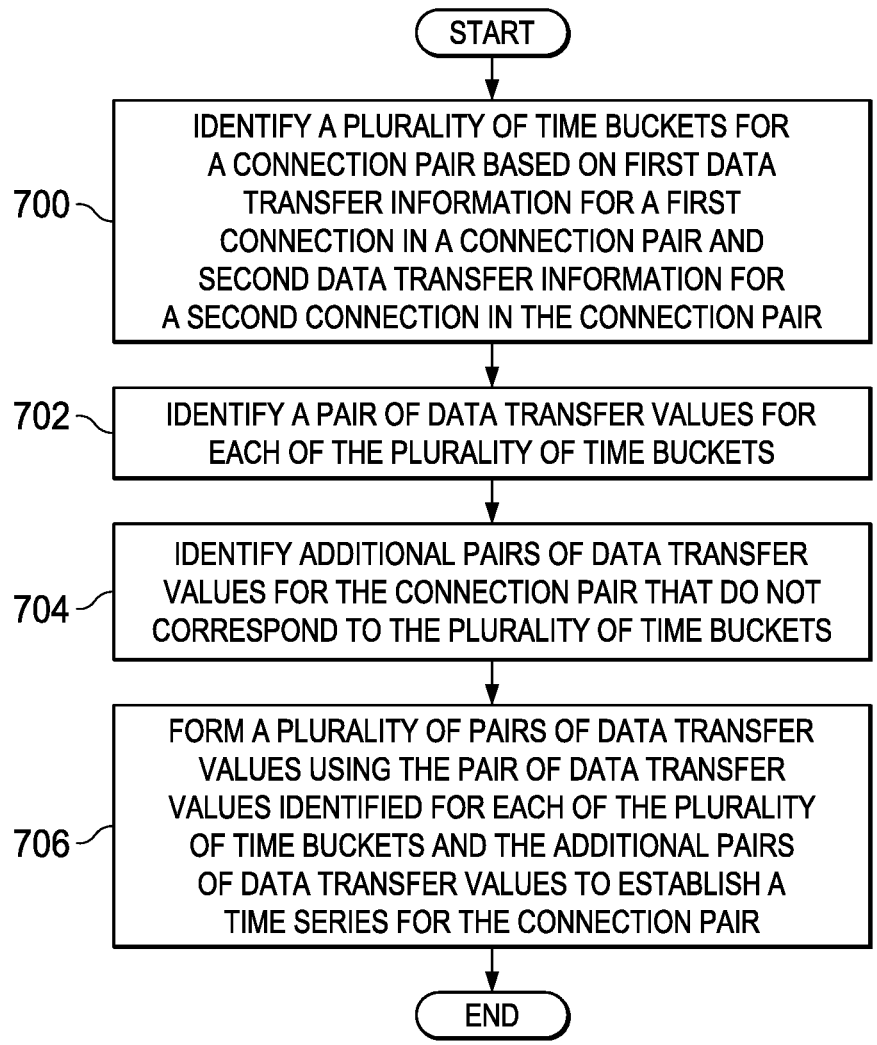
FIG. 7 is a flowchart of a process for building a time series for a connection pair in accordance with an illustrative embodiment.

With reference now to FIG. 7, a flowchart of a process for building a time series for a connection pair is depicted in accordance with an illustrative embodiment. The process illustrated in FIG. 7 may be implemented using network manager 242 described in FIGS. 2-3.

The process may begin by identifying a plurality of time buckets for a connection pair based on first data transfer information for a first connection in a connection pair and second data transfer information for a second connection in the connection pair (operation 700). Next, a pair of data transfer values is identified for each of the plurality of time buckets (operation 702). Thereafter, additional pairs of data transfer values are identified for the connection pair that do not correspond to the plurality of time buckets (operation 704). The pair of data transfer values identified for each of the plurality of time buckets and the additional pairs of data transfer values form a plurality of pairs of data transfer values that establish a time series for the connection pair (operation 706), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, or some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 8:
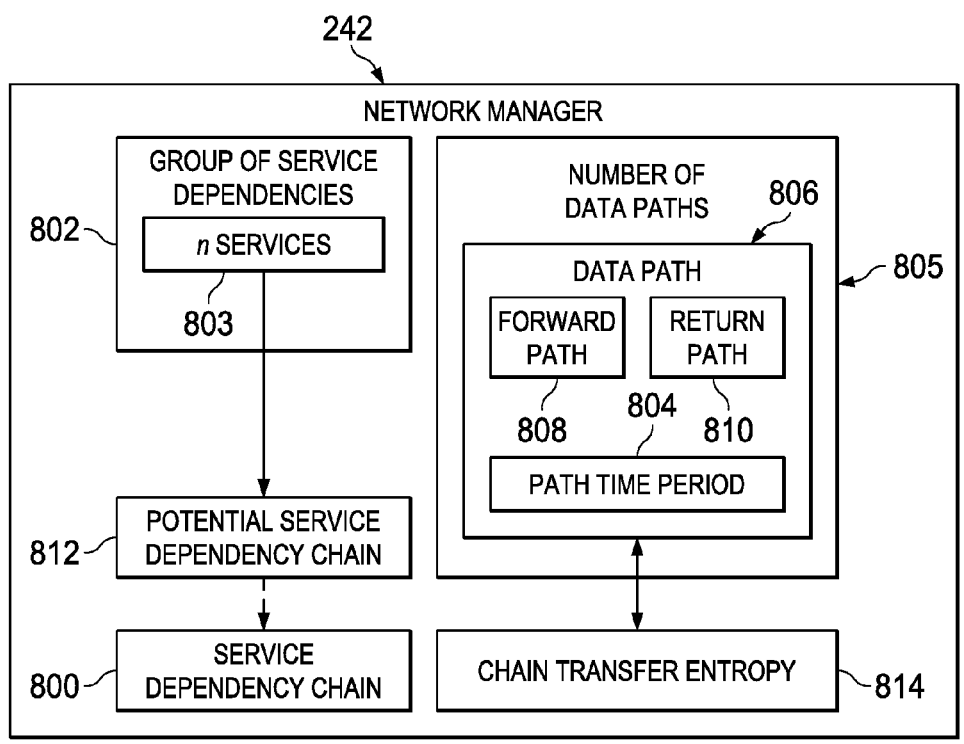
FIG. 8 is a block diagram of a network manager in accordance with an illustrative embodiment.

With reference now to FIG. 8, another block diagram of network manager 242 from FIGS. 2-3 is depicted in accordance with an illustrative embodiment. In this illustrative example, network manager 242 may be used to identify service dependency chain 800. Service dependency chain 800 may be an example of one implementation for service dependency cluster 354 in FIG. 3.

Service dependency chain 800 may take the form of a chain of service dependencies. In these illustrative examples, the operations and functions described as being performed by network manager 242 may be performed by connection manager 300 in FIG. 3, time series builder 302 in FIG. 3, filter manager 304 in FIG. 3, dependency evaluator 306 in FIG. 3, or a combination thereof.

In one illustrative example, network manager 242 identifies group of service dependencies 802. In this illustrative example, each of group of service dependencies 802 may be identified in a manner similar to service dependency 352 in FIG. 3. In this illustrative example, group of service dependencies 802 includes multiple service dependencies between n services 803, where n is equal to or greater than three.

Determining whether group of service dependencies 802 form service dependency chain 800 includes evaluating time series for group of service dependencies 802. In one illustrative example, group of service dependencies 802 may include the following service dependencies:

$$SD_{1\to2}, SD_{2\to3}, \ldots, SD_{n-1\to n}, \qquad (10)$$

between Service_1, Service_2, ..., Service_n, where SD represents a service dependency.

The corresponding group of transfer entropies for group of service dependencies 802 include the following:

$$TE_{1\to2}, TE_{2\to3}, \ldots, TE_{n-1\to n}, \qquad (11)$$

where TE represents transfer entropy and $TE_{1\to2}$, $TE_{2\to3}, \ldots, TE_{n-1\to n}$ are all greater than a selected threshold.

Network manager 242 creates data path 806 based on monitoring data 240. In particular, network manager 242 creates data path 806 based on data transfer information 329. In one illustrative example, network manager 242 divides time into time intervals, with each time interval equal to path time period 804 of $\Delta_P$.

Path time period 804, $\Delta_P$, may be estimated based on monitoring data 240. In one illustrative example, path time period 804 may be the maximum time that a given piece of information will take to travel from Service_1 to Service_n and for the corresponding response to travel from Service_n to Service_1. For example, without limitation, the average of service request-response time measurements may be multiple by a selected factor, f, to account for delays. This factor f may be, for example, without limitation, 2, and may account for delays, including, but not limited to, queuing delays in the network.

Network manager 242 uses the path time period 804 and the time series created for each service dependency in group of service dependencies 802 to build number of data paths 805 for group of service dependencies 802. As used herein, a "number of" items may include one or more items. In this manner, number of data paths 805 may include one or more data paths. For example, network manager 242 may build a data path, such as data path 806, for each piece of information that is sent from Service_1 to determine whether n services 803 form service dependency chain 800.

In building data path 806, network manager 242 takes into account that the smallest amount of information that Service_1 sends to Service_n cannot be greater than the smallest amount of information forwarded by one of the services within n services 803. Data path 806 may be represented using (W(t), Z(t)).

In building data path 806, W(t) may be defined as an amount of information that is initially sent from Service_1. This amount of information may be for a piece of information in the form of a packet, a number of packets, a number of bytes, or data of some other measure of interest. Z(t) may be defined as the minimum amount of information sent back to Service_1 in response.

Data path 806 may include forward path 808 and return path 810, which may be represented by W(t) and Z(t), respectively. Forward path 808 may be the path through services that a piece of information is sent from Service_1 to Service_n. Return path 810 may be a path through which a response to that piece of information is returned from Service_n back to Service_1.

Forward path 808 may be based on a forward communication chain that flows from Service_1 to Service_n. For example, without limitation, a piece of information, such as packet $A_1(t)$, may be sent from Service_1 to Service_2, followed by packet $A_2(t)$ from Service_2 to service 3, ..., and packet $A_{n-1}(t)$ from Service_n-1 to Service_n.

Return path 810 may flow from Service_n back to Service_1. Return path 810 may be based on the return communication chain that flows from Service_n to Service_1. For example, without limitation, a piece of information, such as packet $B_1(t)$ may be sent from Service_n to Service_n-1, ..., followed by packet $B_2(t)$ from Service_3 to Service_2, and followed by packet $B_3(t)$ from Service_2 to Service_1. Network manager 242 may build return path 810 such that the t in Z(t) falls within the time period started by W(t).

In one illustrative example, W(t) and Z(t) may be defined as follows:

$$W(t) = A_1(T); \qquad (12)$$

$$Z(t) = \text{Min}(B_1(t), B_2(t), \ldots, B_n(t)). \qquad (13)$$

where Z(t) is the minimum of all the packets $B_i(t)$.

If $B_i(t)$ arrives at one of the n services outside of path time period 804, $\Delta_P$, then data path 806 may be represented using (W(t), 0). If no flow of information in the return direction exists during the path time period 804, then data path 806 may be represented using (W(t), 0).

Multiple data paths may be built for group of service dependencies 802 that form potential service dependency chain 812. These data paths may be used to compute chain transfer entropy 814, which may be used to determine whether potential service dependency chain 812 does indeed form service dependency chain 800. Chain transfer entropy 814 for data path 806 may be computed as follows:

$$TE_{1\to n} = \sum_{y(t+\tau),y^{(k)}(t),x^{(l)}(t)} p(y(t+\tau), y^{(k)}(t), x^{(l)}(t)) \log \frac{p(y(t+\tau) \mid y^{(k)}(t) x^{(l)}(t))}{p(y(t+\tau) \mid y^{(k)}(t))}. \qquad (14)$$

In equation (14), X(t) may represent communication between a client and Service_1. For example, X(t) may represent the amount of information exchanged between a client to Service_1 over a connection between the client and Service_1, where t is the start time of the connection.

Further, W(t) and Z(t) are points that may be used to build a probability distribution function for the random process Y(t). Y(t) may represent communication between Service_1 and Service_n. In other words, Y(t) may represent the amount of information exchanged between Service_1 and Service_n over data path 806, where t is the start time of path time period 804.

In one illustrative example, at any particular time t, the corresponding W(t) and Z(t) may be summed to provide Y(t). In this manner, Y(t) may be built in a manner similar to equation (2) described above.

If chain transfer entropy $TE_{1 \to n}$ is greater than a selected threshold, network manager 242 may conclude that n services 803 are dependent and form service dependency chain 800. This selected threshold may be determined by computing the cumulative distribution function (CDF) of all the chain transfer entropies computed for all of the data paths built. For example, without limitation, the selected threshold may be selected as the cutoff point where more than 80 percent of the chain transfer entropies are equal to or above the selected threshold.

The illustration of network manager 242 in FIG. 8 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 9:
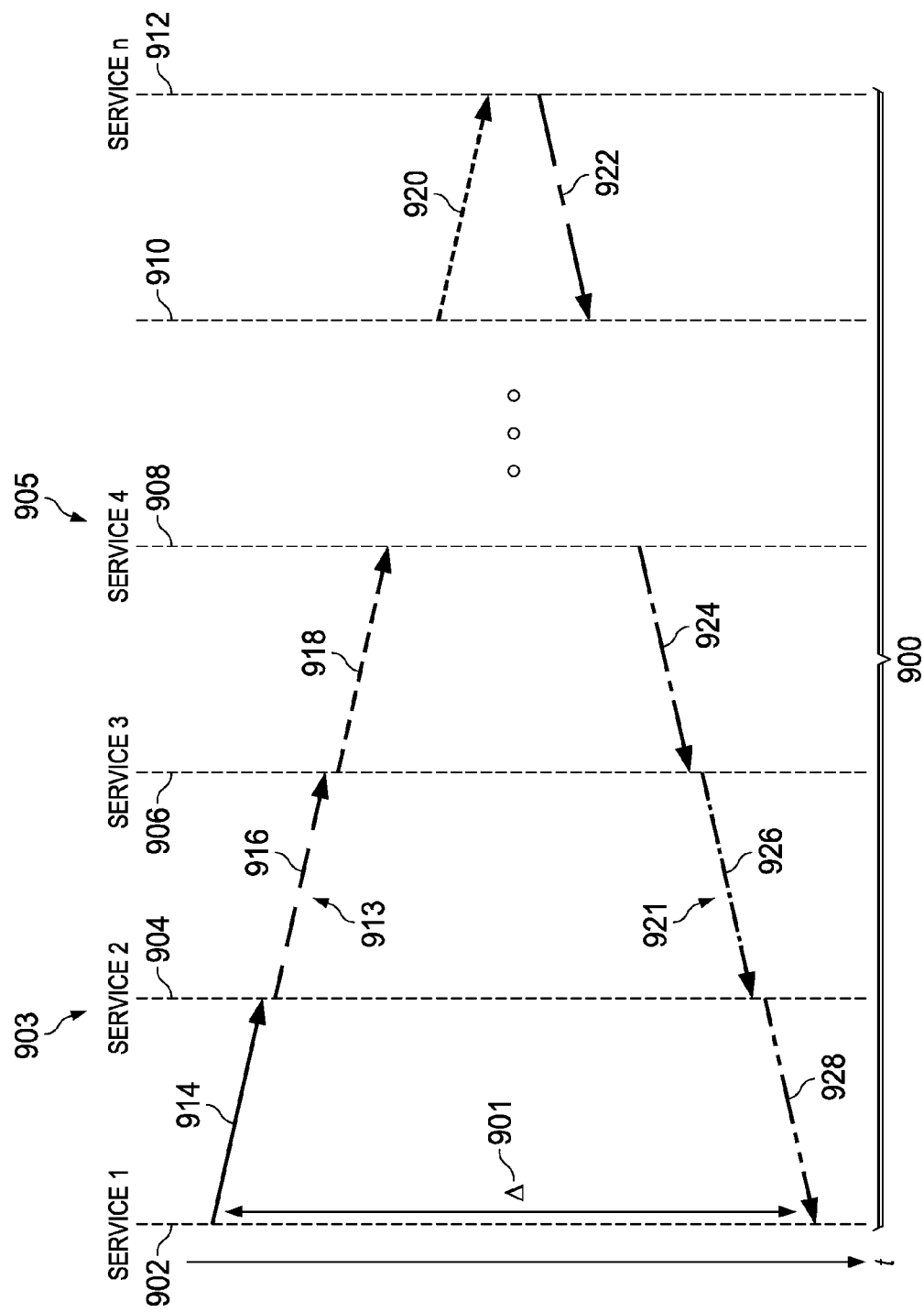
FIG. 9 is an illustration of a data path in accordance with an illustrative embodiment.

With reference now to FIG. 9, an illustration of a data path for a potential service dependency chain is depicted in accordance with an illustrative embodiment. Data path 900 may be an example of one implementation for data path 806 in FIG. 8. As depicted, data path 900 is built within path time period 901, which may be an example of one implementation for path time period 804 in FIG. 8.

Data path 900 flows through n services 903 that form a group of service dependencies. This group of service dependencies may potentially form a service dependency chain. Thus, this group of service dependencies may be referred to as potential service dependency chain 905.

The n services 903 include Service_1 902, Service_2 904, Service_3 906, Service_4 908, ..., Service_n-1 910, and Service_n 912. Potential service dependency chain 905 may include a service dependency between Service_1 902 and Service_2 904, between Service_2 904 and Service_3 906, between Service_3 906 and Service_4 908, and between Service_n-1 910 and Service_n 912.

Forward path 913 is created by link 914, link 916, link 918, ..., and link 920. Each of these forward links represents the forwarding of a piece of information from one service to another service. Return path 921 is created by link 922, ..., link 924, link 926, and link 928. Each of these return links represents the forwarding of a response piece of information from one service to another service.

Further, each of the forward links and return links that make up data path 900 may correspond to a communication between two services that begins at a start time and ends at an end time. As depicted in this example, the start time of each link begins after the end time of the immediately preceding link. Further, all of the links that make up data path 900 fall within path time period 901. Still further, each forward link in forward path 913 has a corresponding return link in return path 921.

Data path 900 may be represented using (W(t), Z(t)). Multiple data paths, similar to data path 900, may be built for different pieces of information and different path time periods for the group of service potential service dependency chain 905. A chain transfer entropy may be computed for potential service dependency chain 905 to determine whether potential service dependency chain 905 do indeed form a service dependency chain.

Figure 10:
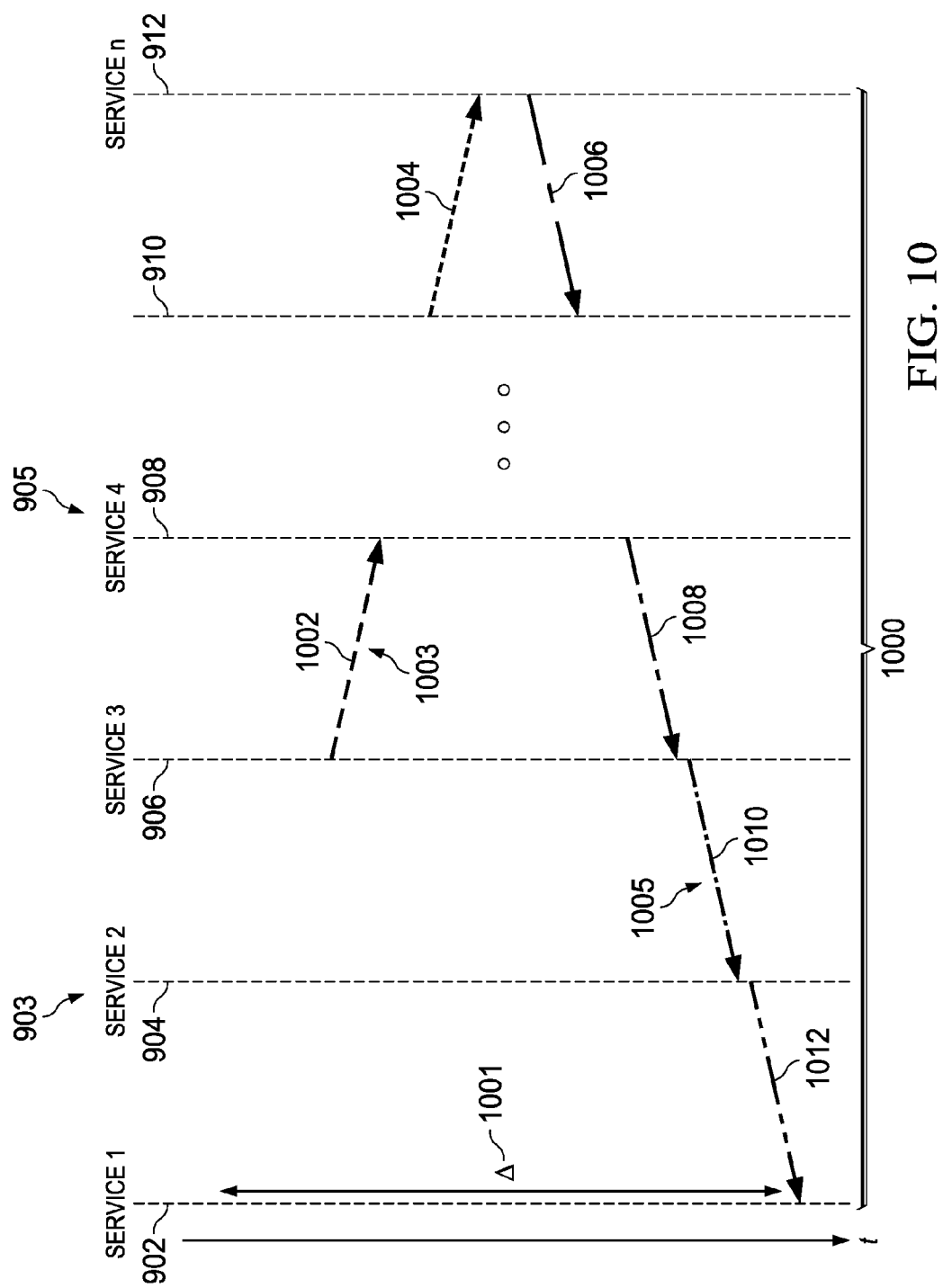
FIG. 10 is an illustration of a data path in accordance with an illustrative embodiment.

With reference now to FIG. 10, an illustration of a different data path for potential service dependency chain 905 from FIG. 9 is shown. In this illustrative example, data path 1000 is built over path time period 1001. Data path 1000 includes forward path 1003, which includes link 1002, ..., and link 1004. Further, data path 1000 includes return path 1005, which includes link 1006, ..., link 1008, link 1010, and link 1012.

As depicted, no forward link has been established between Service_1 902 and Service_2 904 or between Service_2 904 and Service_3 906 along forward path 1003. Consequently, data path 1000 may be represented as (0, Z(t)). W(t) is set to 0 for data path 1000 because there is no piece of information being forwarded from Service_1 902 to Service_2 904 within path time period 1001.

Figure 11:
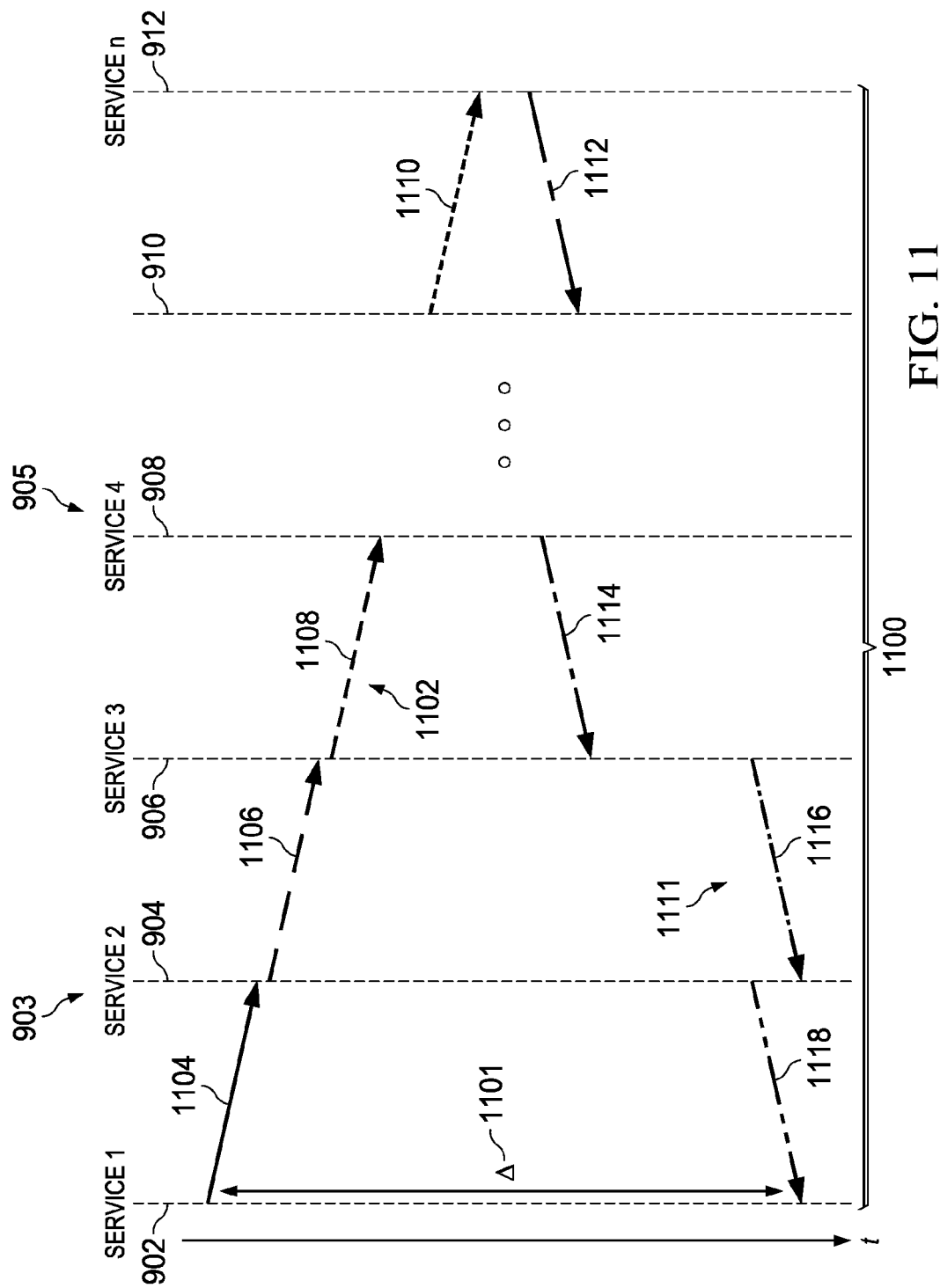
FIG. 11 is an illustration of a data path in accordance with an illustrative embodiment.

With reference now to FIG. 11, an illustration of another data path for potential service dependency chain 905 from FIGS. 9-10 is shown. In this illustrative example, data path 1100 is built over path time period 1101. Data path 1100 includes forward path 1103, which includes link 1104, link 1106, link 1108, ..., and link 1110. Further, data path 1000 includes return path 1111, which includes link 1112, ..., link 1114, link 1116, and link 1118.

As depicted, link 1116 falls outside of path time period 1101. Further, link 1116 begins after the start time of link 1118. Consequently, data path 1100 may be represented as (W(t), 0). Z(t) is set to 0 for data path 1100 because Z(t) is set to the minimum amount of information sent from one service to another service along return path 1111. Because link 1116 falls outside path time period 1101, the information sent from Service_3 906 to Service_2 904 is considered to be zero. Thus, the minimum amount of information sent from one service to another service along return path 1111 is zero.

Figure 12:
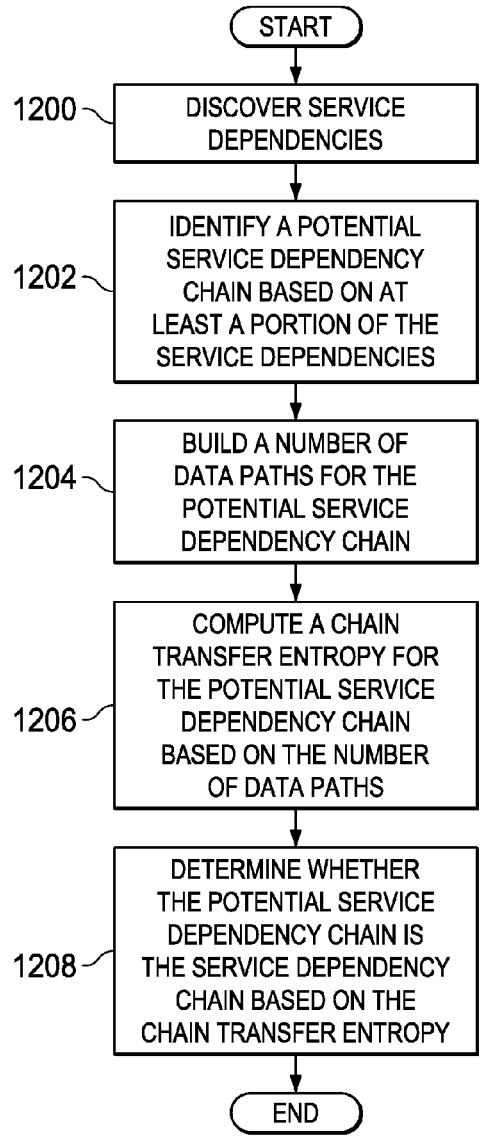
FIG. 12 is a flowchart of a process for discovering dependencies in accordance with an illustrative embodiment.

With reference now to FIG. 12, a flowchart of a process for discovering a service dependency chain is depicted in accordance with an illustrative embodiment. The process illustrated in FIG. 12 may be implemented using network manager 242 in FIG. 8.

The process begins by discovering service dependencies (operation 1200). Next, a potential service dependency chain is identified based on at least a portion of the service dependencies (operation 1202). Thereafter, a number of data paths are built for the potential service dependency chain (operation 1204). In operation 1204, a data path in the number of data paths may include a forward path and a return path, both of which fall within a path time period.

A chain transfer entropy is computed for the potential service dependency chain based on the number of data paths (operation 1206). Then, the process determines whether the potential service dependency chain is the service dependency chain based on the chain transfer entropy (operation 1208), with the process terminating thereafter.

Operation 1208 may be performed by comparing the chain transfer entropy to a selected threshold. The potential service dependency chain may be considered a service dependency chain when, for example, the chain transfer entropy is greater than or equal to the selected threshold.

Figure 13:
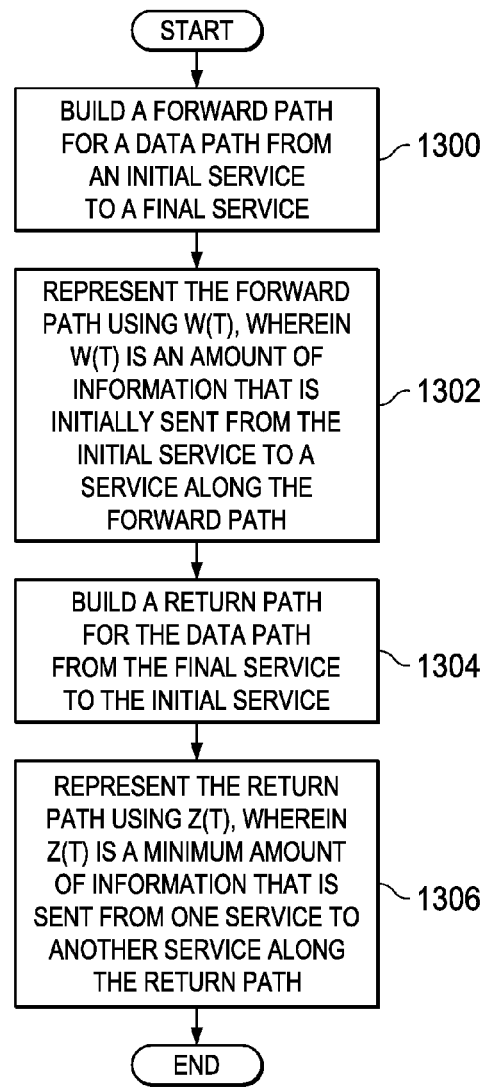
FIG. 13 is a flowchart of a process for building a data path in accordance with an illustrative embodiment.

With reference now to FIG. 13, a flowchart of a process for building a data path is depicted in accordance with an illustrative embodiment. The process illustrated in FIG. 12 may be performed and repeated any number of times to implement operation 1204 in FIG. 12.

The process begins by building a forward path for a data path from an initial service to a final service (operation 1300). In operation 1300, the initial service may be, for example, Service_1, and the final service may be, for example, Service_n. The forward path may be represented using W(t), wherein W(t) is an amount of information that is initially sent from the initial service to a service along the forward path (operation 1302).

A return path is built for the data path from the final service to the initial service (operation 1304). The return path is represented using Z(t), wherein Z(t) is a minimum amount of information that is sent from one service to another service along the return path (operation 1306), with the process terminating thereafter.

Figure 14:
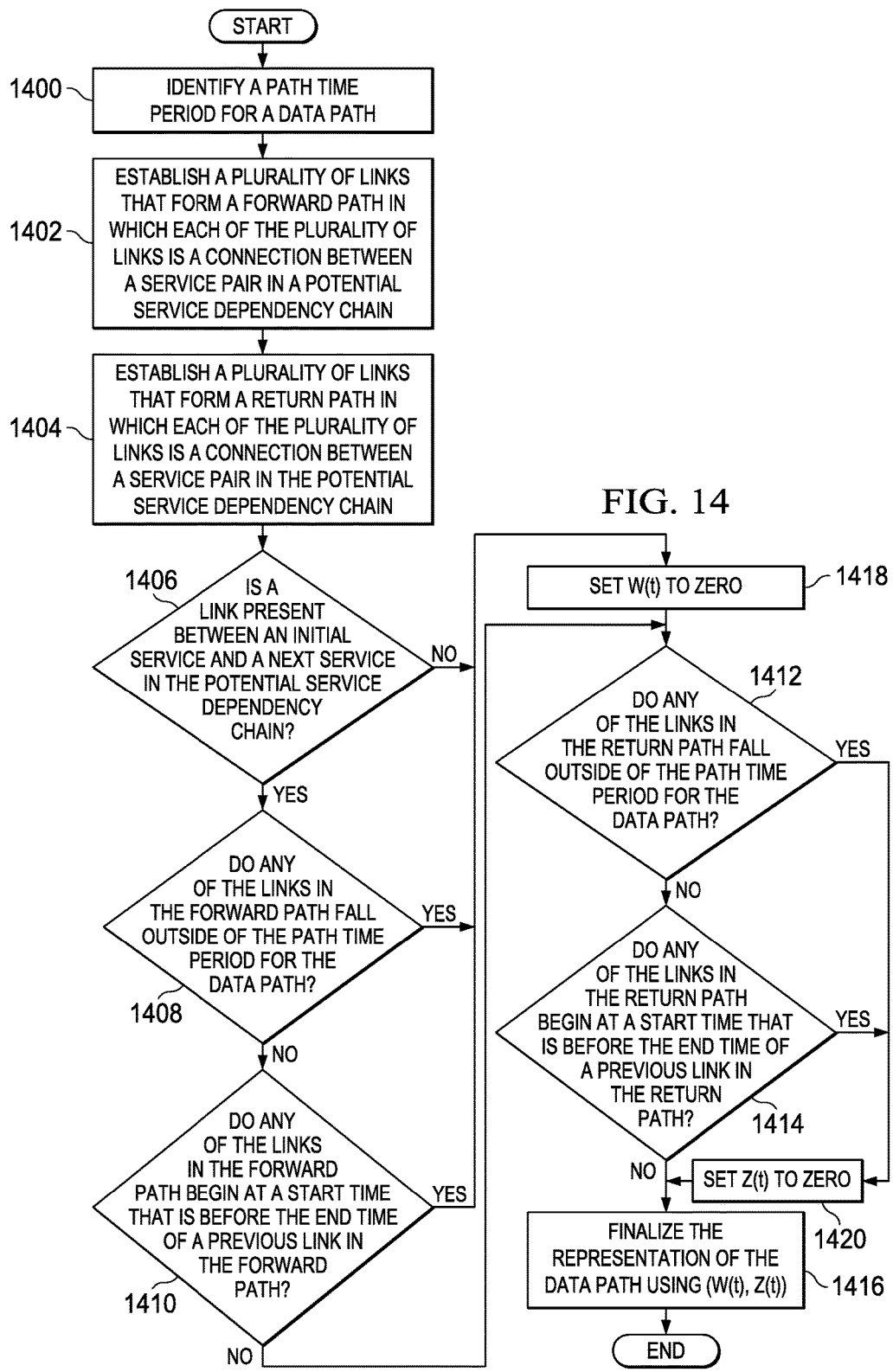
FIG. 14 is a flowchart of a process for building a data path in accordance with an illustrative embodiment.

With reference now to FIG. 14, a flowchart of a process for building a data path is depicted in accordance with an illustrative embodiment. The process illustrated in FIG. 14 may be performed and repeated any number of times to implement operation 1204 in FIG. 12.

The process begins by identifying a path time period for a data path (operation 1400). Next, a plurality of links that form a forward path is established in which each of the plurality of links is a connection between a service pair in a potential service dependency chain (operation 1402). Link 914, link 916, link 918, . . . , and link 920 that form forward path 913 in FIG. 9 may be an example of the plurality of links that may be formed in operation 1402.

Next, a plurality of links that form a return path is established in which each of the plurality of links is a connection between a service pair in the potential service dependency chain (operation 1404). Link 922, . . . , link 924, link 926, and link 928 that form return path 921 in FIG. 9 may be an example of the plurality of links that may be formed in operation 1404.

A determination is made as to whether a link is present between an initial service and a next service in the potential service dependency chain (operation 1406). If a link is present between the initial service and the next service in the potential service dependency chain, a determination is made as to whether any of the links in the forward path fall outside of the path time period for the data path (operation 1408).

If no links in the forward path fall outside of the path time period, a determination is made to whether any of the links in the forward path begin at a start time that is before the end time of a previous link in the forward path (operation 1410). If none of the links in the forward path begin at a start time that is before the end time of a previous link in the forward path, a determination is made as to whether any of the links in the return path fall outside of the path time period for the data path (operation 1412).

If no links in the return path fall outside of the path time period, a determination is made to whether any of the links in the return path begin at a start time that is before the end time of a previous link in the return path (operation 1414). If none of the links in the return path begin at a start time that is before the end time of a previous link in the return path, the process then finalizes the representation of the data path using (W(t), Z(t)) (operation 1416), with the process terminating thereafter.

With reference again to operation 1406, if no link is present between the initial service and the next service in the potential service dependency chain, the process sets W(t) to zero (operation 1418), with the process then proceeding to operation 1412 as described above. With reference again to operation 1408, if any of the links in the forward path fall outside of the path time period, the process proceeds to operation 1418 as described above. Further, with reference again to operation 1410, if any of the links in the forward path begin at a start time that is before the end time of a previous link in the forward path, the process proceeds to operation 1418 as described above.

Further, with reference again to operation 1412, if any of the links in the return path fall outside of the path time period, the process sets Z(t) to zero (operation 1420), with the process then proceeding to operation 1416 as described above. With reference again to operation 1414, any of the links in the return path begin at a start time that is before the end time of a previous link in the return path, the process proceeds to operation 1420 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation, a portion of a step, or some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 15:
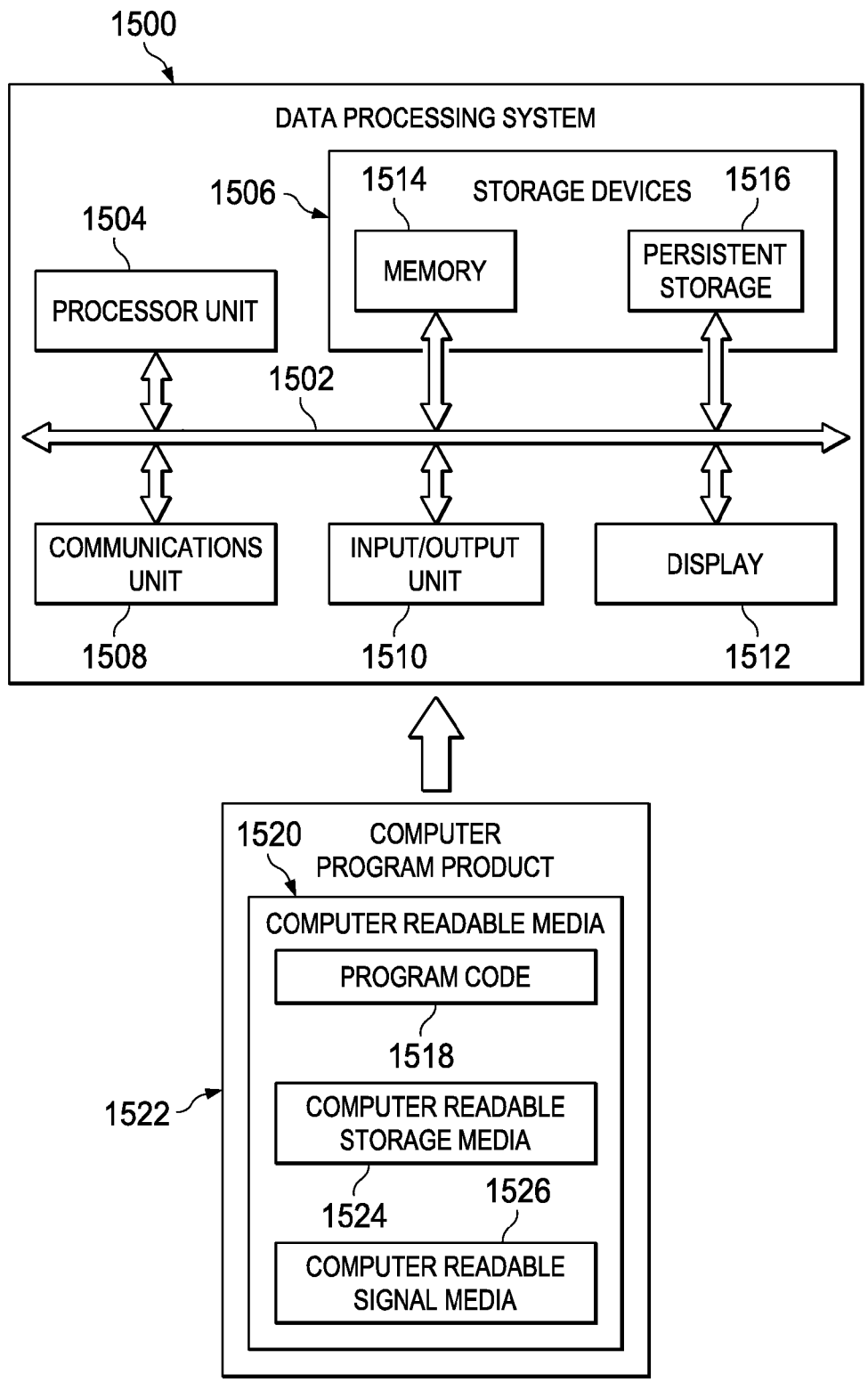
FIG. 15 is a block diagram of a data processing system in accordance with an illustrative embodiment.

Turning now to FIG. 15, an illustration of a data processing system is depicted in the form of a block diagram in accordance with an illustrative embodiment. Data processing system 1500 may be used to implement computer system 244 in FIG. 2. As depicted, data processing system 1500 includes communications framework 1502, which provides communications between processor unit 1504, storage devices 1506, communications unit 1508, input/output unit 1510, and display 1512. In some cases, communications framework 1502 may be implemented as a bus system.

Processor unit 1504 is configured to execute instructions for software to perform a number of operations. Processor unit 1504 may comprise at least one of a number of processors, a multi-processor core, or some other type of processor, depending on the implementation. In some cases, processor unit 1504 may take the form of a hardware unit, such as a circuit system, an application specific integrated circuit (ASIC), a programmable logic device, or some other suitable type of hardware unit.

Instructions for the operating system, applications, and programs run by processor unit 1504 may be located in storage devices 1506. Storage devices 1506 may be in communication with processor unit 1504 through communications framework 1502. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 1514 and persistent storage 1516 are examples of storage devices 1506. Memory 1514 may take the form of, for example, a random access memory or some type of volatile or non-volatile storage device. Persistent storage 1516 may comprise any number of components or devices. For example, persistent storage 1516 may comprise a hard drive, a flash memory, a rewritable optical disk, a rewritable magnetic tape, or some combination of the above. The media used by persistent storage 1516 may or may not be removable.

Communications unit 1508 allows data processing system 1500 to communicate with other data processing systems, devices, or both. Communications unit 1508 may provide communications using physical communications links, wireless communications links, or both.

Input/output unit 1510 allows input to be received from and output to be sent to other devices connected to data processing system 1500. For example, input/output unit 1510 may allow user input to be received through a keyboard, a mouse, some other type of input device, or a combination thereof. As another example, input/output unit 1510 may allow output to be sent to a printer connected to data processing system 1500.

Display 1512 is configured to display information to a user. Display 1512 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 1504 using computer-implemented instructions. These instructions may be referred to as program code, computer usable program code, or computer readable program code and may be read and executed by one or more processors in processor unit 1504.

In these examples, program code 1518 is located in a functional form on computer readable media 1520, which is selectively removable, and may be loaded onto or transferred to data processing system 1500 for execution by processor unit 1504. Program code 1518 and computer readable media 1520 together form computer program product 1522. In this illustrative example, computer readable media 1520 may be computer readable storage media 1524 or computer readable signal media 1526.

Computer readable storage media 1524 is a physical or tangible storage device used to store program code 1518 rather than a medium that propagates or transmits program code 1518. Computer readable storage media 1524 may be, for example, without limitation, an optical or magnetic disk or a persistent storage device that is connected to data processing system 1500.

Alternatively, program code 1518 may be transferred to data processing system 1500 using computer readable signal media 1526. Computer readable signal media 1526 may be, for example, a propagated data signal containing program code 1518. This data signal may be an electromagnetic signal, an optical signal, or some other type of signal that can be transmitted over physical communications links, wireless communications links, or both.

The illustration of data processing system 1500 in FIG. 15 is not meant to provide architectural limitations to the manner in which the illustrative embodiments may be implemented. The different illustrative embodiments may be implemented in a data processing system that includes components in addition to or in place of those illustrated for data processing system 1500. Further, components shown in FIG. 15 may be varied from the illustrative examples shown.

Thus, the illustrative embodiments provide a method and apparatus for discovering dependencies between services across a data network passively. In one illustrative example, a method for discovering service dependencies may be provided. A plurality of connections between nodes in a data network may be identified. The nodes may include any number of clients and any number of services. A set of connection pairs may then be identified based on the plurality of connections identified. A set of time series may be created for the set of connection pairs using monitoring data received from a plurality of sensors monitoring the network. Service dependencies may then be discovered using the set of time series. In some cases, service dependency clusters may then be discovered based on the service dependencies identified.

In particular, services may be identified. Next, service dependencies between these services are discovered. With a service dependency, fulfilling a request received at the first service requires establishing a connection with the second service and exchanging data with the second service. Further, the server dependency may be quantized by measuring the amount of data exchanged between the first service and the second service using transfer entropy. Thereafter, clusters of service dependencies may be identified. Using transfer entropy in the process described above enables a more accurate measure of dependency as compared to relying on simple temporal correlations or other types of correlations.

The method and apparatus provided by the illustrative embodiments for discovering service dependencies may aid network administrators in identifying services that may be more important to the stability and operation of the network and in scheduling maintenance for these services. By being able to more accurately determine the dependencies between the services in a data network, network administrators and other types of network operators may be able to provision and manage these networks more efficiently.

The illustrative embodiments provide a passive approach to discovering service dependence chains. In other words, the method and apparatus provided by the illustrative embodiments do not require any active injection of data traffic or data delays and do not require deployment of any additional host-based monitoring software, collection software, or combination thereof at any servers or host nodes.

The illustrative embodiments provide a method and apparatus that enable identifying existing services in the data network and identifying dependencies between three or more services where one service depends on the other in its operation. A service dependency chain between services may exist where an initial service, when called to action, requires initiating a connection to a second service, which requires initiating a connection to a third service, and so on. This service dependency chain may be formalized and measured by computing the chain transfer entropy.

The illustrative embodiments provide a method and apparatus for building network service profiles that represent network services that work together in close cooperation to perform a high-level network function, such as, for example, without limitation, an online email service. Such network service profiles may be compiled by finding clusters of services that typically work together to deliver a higher level networking function or service to the user. In some cases, the method and apparatus described by the different illustrative embodiments may be used to detect attacks and deviations from normal operations of a network by continuously discovering service dependencies and service dependency chains and then comparing the discovered service dependencies and discovered service dependency chains to baseline service dependencies and baseline service dependency chains, respectively.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, to best explain the practical application, and to enable others of ordinary skill in the art to understand the disclosure for various embodiments with various modifications as are suited to the particular use contemplated.

What is claimed is:

1. A method for discovering a service dependency chain in a data network without any active injection of data traffic, the method comprising:
   providing a network manager running on a processor unit and connected to the data network, the network manager configured to perform the following steps:
   discovering service dependencies;
   identifying a potential service dependency chain based on at least a portion of the service dependencies;
   building a number of data paths for the potential service dependency chain;
   computing a chain transfer entropy for the potential service dependency chain based on the number of data paths; and
   determining whether the potential service dependency chain is the service dependency chain based on the chain transfer entropy;
   wherein the network manager compares the discovered service dependencies to baseline service dependencies and compares the service dependency chain to a baseline service dependency chain in order to detect attacks and deviations from normal operations of the network.

2. The method of claim 1, wherein building the number of data paths comprises:
   building a data path over a path time period.

3. The method of claim 1, wherein building the number of data paths comprises:
   building a forward path; and
   building a return path, wherein the forward path and the return path form a data path in the number of data paths.

4. The method of claim 1, wherein building the number of data paths comprises:
   building a forward path for a data path in the number of data paths from an initial service to a final service; and
   representing the forward path using W(t), wherein W(t) is an amount of information that is initially sent from the initial service to a service along the forward path.

5. The method of claim 4, wherein building the number of data paths further comprises:
   building a return path for the data path in the number of data paths from the final service to the initial service; and
   representing the return path using Z(t), wherein Z(t) is a minimum amount of information that is sent from one service to another service along the return path.

6. The method of claim 1, wherein determining whether the potential service dependency chain is the service dependency chain based on the chain transfer entropy comprises:
   comparing the chain transfer entropy to a selected threshold.

7. The method of claim 1, wherein determining whether the potential service dependency chain is the service dependency chain based on the chain transfer entropy comprises:
   determining that the potential service dependency chain represents the service dependency chain when the chain transfer entropy is greater than or equal to a selected threshold.

8. The method of claim 1, wherein identifying the potential service dependency chain comprises:
   identifying a group of service dependencies formed by n services based on at least a portion of the service dependencies discovered.

9. The method of claim 1, wherein discovering the service dependencies comprises:
   identifying a plurality of connections between nodes in a data network.

10. The method of claim 9, wherein discovering the service dependencies further comprises:
    identifying a set of connection pairs based on the plurality of connections identified.

11. The method of claim 10, wherein discovering the service dependencies further comprises:
    creating a set of time series for the set of connection pairs using monitoring data received from a plurality of sensors monitoring the data network.

12. The method of claim 11, wherein discovering the service dependencies further comprises:
    discovering the service dependencies using the set of time series.

13. The method of claim 12, wherein the network manager is configured to run on a processor unit and to discover the service dependency chain without any active injection of data traffic.

14. The method of claim 1, wherein the service dependencies are discovered using data from a number of sensors in a network.

15. The method of claim 1, further comprising:
    computing chain transfer entropies for the number of data paths;
    computing a cumulative distribution function of the chain transfer entropies for the number of data paths; and
    determining that the potential service dependency chain is the service dependency chain when the chain transfer entropy is greater than the cumulative distribution function.

16. A method for discovering a service dependency chain between three or more services, the method comprising:
    providing a network manager running on a processor unit and connected to the data network, the network manager configured to perform the following steps:
    discovering service dependencies;
    identifying a potential service dependency chain based on at least a portion of the service dependencies;
    building a number of data paths for the potential service dependency chain, wherein a data path in the number of data paths includes a forward path and a return path that both fall within a path time period;
    computing a chain transfer entropy for the potential service dependency chain based on the number of data paths; and
    determining whether the potential service dependency chain is the service dependency chain based on the chain transfer entropy;
    wherein the network manager compares the discovered service dependencies to baseline service dependencies and compares the service dependency chain to a baseline service dependency chain in order to detect attacks and deviations from normal operations of the network.

17. The method of claim 16, wherein building the number of data paths comprises:
building the forward path for the data path in the number of data paths from an initial service to a final service; and
representing the forward path using W(t), wherein W(t) is a piece of information that is initially sent from the initial service.

18. The method of claim 17, wherein building the number of data paths further comprises:
building the return path for the data path in the number of data paths from the final service to the initial service; and
representing the return path using Z(t), wherein Z(t) is a minimum amount of information that is sent from one service to another service along the return path.

19. The method of claim 16, wherein discovering the service dependencies comprises:
identifying a plurality of connections between nodes in a data network;
identifying a set of connection pairs based on the plurality of connections identified;
creating a set of time series for the set of connection pairs using monitoring data received from a plurality of sensors monitoring the data network; and
discovering the service dependencies using the set of time series.

20. The method of claim 16, wherein the service dependencies are discovered using data from a number of sensors in a network.

21. The method of claim 16, further comprising:
computing chain transfer entropies for the number of data paths;
computing a cumulative distribution function of the chain transfer entropies for the number of data paths; and
determining that the potential service dependency chain is the service dependency chain when the chain transfer entropy is greater than the cumulative distribution function.

22. An apparatus comprising:
a network manager, running on a processor unit in a data network having a number of client devices and a number of service devices, that discovers service dependencies, the network manager receiving data from a number of sensors; responsive to receiving the data, the network manager identifies a potential service dependency chain based on at least a portion of the service dependencies; builds a number of data paths for the potential service dependency chain; computes a chain transfer entropy for the potential service dependency chain based on the number of data paths; and determines that the potential service dependency chain is the service dependency chain when the chain transfer entropy of the potential service dependency chain is greater than a cumulative distribution function of the chain transfer entropies for the number of data paths; wherein the network manager compares the discovered service dependencies to baseline service dependencies and compares the service dependency chain to a baseline service dependency chain in order to detect attacks and deviations from normal operations of the network.

23. The apparatus of claim 22, wherein a data path in the number of data paths includes a forward path and a return path.

24. The apparatus of claim 23, wherein the forward path is represented using W(t) in which W(t) is a piece of information that is initially sent from an initial service and wherein the return path is represented using Z(t) in which Z(t) is a minimum amount of information that is sent from one service to another service along the return path.

25. The apparatus of claim 22, wherein the network manager comprises:
a connection manager that identifies a plurality of connections between nodes in a data network and that identifies a set of connection pairs based on the plurality of connections identified;
a time series builder that creates a set of time series for the set of connection pairs; and
a dependency evaluator that discovers the service dependencies in the data network using the set of time series.

26. The apparatus of claim 22, wherein the network manager is configured to run on a processor unit and to discover the service dependency chain without any active injection of data traffic.

* * * * *